(12) United States Patent
Holman

(10) Patent No.: US 9,823,411 B2
(45) Date of Patent: Nov. 21, 2017

(54) ETENDUE-PRESERVING LIGHT COUPLING SYSTEM HAVING LIGHT OUTPUT APERTURE SMALLER THAN LIGHT INPUT APERTURE

(71) Applicant: SnapTrack, Inc., San Diego, CA (US)

(72) Inventor: Robert Louis Holman, San Jose, CA (US)

(73) Assignee: SnapTrack Inc., San Diego, CA (US)

( * ) Notice: Subject to any disclaimer, the term of this patent is extended or adjusted under 35 U.S.C. 154(b) by 145 days.

(21) Appl. No.: 14/866,062

(22) Filed: Sep. 25, 2015

(65) Prior Publication Data

US 2017/0090102 A1 Mar. 30, 2017

(51) Int. Cl.
*F21V 8/00* (2006.01)

(52) U.S. Cl.
CPC ........... *G02B 6/0061* (2013.01); *G02B 6/005* (2013.01); *G02B 6/0046* (2013.01); *G02B 6/0055* (2013.01); *G02B 6/0073* (2013.01); *G02B 6/0008* (2013.01)

(58) Field of Classification Search
CPC ..... F21V 5/008; G02B 6/0046; G02B 6/0061; G02B 6/0055; G02B 6/007
See application file for complete search history.

(56) References Cited

U.S. PATENT DOCUMENTS

| 6,164,789 A | 12/2000 | Unger et al. |
| 7,131,735 B2 * | 11/2006 | Yokoyama ........... G03B 21/208 345/39 |
| 7,400,439 B2 | 7/2008 | Holman |
| 7,543,959 B2 * | 6/2009 | Bierhuizen ............ H04N 9/315 257/98 |
| 7,677,783 B2 | 3/2010 | Wei et al. |
| 8,075,147 B2 * | 12/2011 | Chaves ..................... F21K 9/61 362/235 |
| 8,662,727 B2 | 3/2014 | Kanade et al. |
| 8,714,784 B2 | 5/2014 | Luo |

(Continued)

FOREIGN PATENT DOCUMENTS

| WO | WO-2013037288 A1 | 3/2013 |
| WO | WO-2014120245 A1 | 8/2014 |

(Continued)

OTHER PUBLICATIONS

International Search Report and Written Opinion-PCT/US2016/052507-ISA/EPO-Dec. 6, 2016.

*Primary Examiner* — Peggy Neils
(74) *Attorney, Agent, or Firm* — Knobbe, Martens, Olson & Bear, LLP

(57) ABSTRACT

This disclosure provides systems, methods and apparatus for providing illumination. In one aspect, an etendue preserving optical coupling system configured to: receive incident light through an input aperture; and emit the incident light through an output aperture having an area smaller than an area of the input aperture is provided. The light output from the optical coupling system is coupled into a light receiving system including material having substantially the same refractive index as the refractive index of the material of the optical coupling system. The light receiving system includes a light guide configured to internally propagate the redirected light and to release light to illuminate the ambient environment.

22 Claims, 14 Drawing Sheets

(56) References Cited

U.S. PATENT DOCUMENTS

| | | |
|---|---|---|
| 8,721,149 B2 | 5/2014 | Holman |
| 8,807,916 B2 * | 8/2014 | Sheridan .................. F02C 7/36 |
| | | 415/1 |
| 8,899,808 B2 | 12/2014 | Speier et al. |
| 2014/0192558 A1 * | 7/2014 | Dau ..................... G02B 6/0073 |
| | | 362/612 |
| 2014/0212090 A1 | 7/2014 | Wilcox |
| 2014/0268872 A1 | 9/2014 | Holman et al. |
| 2016/0161656 A1 * | 6/2016 | York ................... G02B 6/0006 |
| | | 362/612 |

FOREIGN PATENT DOCUMENTS

| | | |
|---|---|---|
| WO | WO-2014203850 A1 | 12/2014 |
| WO | WO-2015010076 A1 | 1/2015 |

* cited by examiner

ETENDUE-PRESERVING LIGHT COUPLING SYSTEM HAVING LIGHT OUTPUT APERTURE SMALLER THAN LIGHT INPUT APERTURE

TECHNICAL FIELD

This disclosure relates to illumination devices.

DESCRIPTION OF THE RELATED TECHNOLOGY

The state of illumination systems and luminaires used in indoor and outdoor residential or commercial lighting applications has not changed appreciably over the years. Standard illumination systems and luminaires can be large, heavy and bulky. Furthermore, it may not be possible to achieve a desired illumination pattern with standard illumination systems. For example, the illumination provided by standard illumination systems can often have non-uniform brightness, with the illumination being brightest directly below the standard illumination system while decreasing in brightness as distance from the standard illumination system increases. As another example, some applications may prefer that only a certain area be illuminated and other areas in the vicinity of the area to be illuminated do not receive any illumination. However, viewers in the vicinity of the area to be illuminated may receive some unwanted glare. Additionally, net illumination efficiencies obtained from standard illumination systems may be far lower than desired from a modern energy conservation perspective. As illumination systems adopt usage of multi-color LED's so as to provide illumination with spectral control, standard illuminations system may not be capable of providing chromatically uniform illumination, and may deliver illumination patterns in which the color varies. The appearance of color break-up within an illumination system's aperture can be undesirable aesthetically. Color non-uniformities on the surfaces to be illuminated (e.g., ceilings, floors and walls) can also be undesirable. Illumination systems that can mix and homogenize the light from multi-colored LED's, and/or can distribute light over illumination apertures large enough to dilute the aperture brightness sufficiently so as to reduce disability glare are desirable.

Illumination systems and/or luminaires utilizing assemblies of miniature light emitting diodes (LEDs) discretely or in arrays are being developed. Illumination systems and/or luminaires utilizing assemblies of miniature light emitting diodes (LEDs) can be lighter and more compact than conventional illumination systems and luminaires.

SUMMARY

The systems, methods and devices of the disclosure each have several innovative aspects, no single one of which is solely responsible for the desirable attributes disclosed herein.

Various implementations described herein include illumination systems that include an etendue preserving optical coupling system wherein the size of the output aperture of the optical coupling system is smaller than the size of the input aperture of the optical coupling system, with the smaller aperture connected to a receiving optical system whose refractive index is substantially the same as that of the etendue-preserving optical coupling system. The receiving optical system may have a light redirecting element that is configured to receive light from the light output surface of the optical coupling system along an incident direction and to redirect the light along an output direction that is at an angle with respect to the incident direction.

In various implementations the optical coupling system is configured to transform the Lambertian output light distribution profile of a LED or array of LED's into a compressed light distribution profile as light from the LED propagates through the optical coupling system and the optical coupling system is also configured to transform the light distribution profile back into a Lambertian distribution upon reaching the coupling optic's output aperture. The refractive index (n) of the material of the optical coupling system can be configured to receive the output Lambertian distribution within the material of the optical coupling system converting it to a more condensed angular distribution while containing that distribution within the material of the optical coupling system. In some implementations, the output light which may be converted back to a Lambertian distribution may be directed along directions centered at a normal to the light output surface of the optical coupling system and that enters into the correspondingly similar refractive index of a receiving optical system attached to it. In various implementations, the receiving optical system can be a tapered light guide. The output aperture of the optical coupling system can be configured such that all or substantially all the light (with the exception of material losses) from the optical coupling system would be coupled into the tapered light guide having substantially the same refractive index as the material of the optic.

One innovative aspect of the subject matter described in this disclosure can be implemented in an optical system including an optical coupling system and an optical receiving system. The optical coupling system includes a light input surface configured to receive incident light through an input aperture; and a light output surface configured to emit the incident light through an output aperture having an area smaller than an area of the input aperture. The optical coupling system is configured to optically couple to an optical source separated from the light input surface by a gap. The gap includes a medium having lower refractive index than the refractive index of material forming the optical coupling system. For example, the gap can include air.

The optical receiving system is optically coupled to the light output surface of the optical coupling system. The optical receiving system includes a light redirecting element configured to receive light from the light output surface of the optical coupling system along an incident direction and redirect the light along an output direction that is at an angle with respect to the incident direction. In various implementations, the angle between the output direction and the incident direction can be less than or equal to 160 degrees. The optical receiving system can include a light guide configured to internally propagate the redirected light. The light guide has a light output surface and in various implementations, a cross-section of the light guide in a plane perpendicular to the light output surface is tapered such that a surface opposite the light output surface is inclined and disposed at an angle $\alpha_1$ with respect to the light guide output surface, the angle $\alpha_1$ being less than 15 degrees. A material of the optical receiving system optically coupling with the output aperture has substantially the same refractive index as material of the optical coupling system. The optical coupling system is configured to preserve etendue of the light emitted from the output surface relative to the etendue of light incident on the input surface of the optical coupling system.

In various implementations, a ratio of the area of the input aperture to the area of the output aperture of the optical coupling system can be approximately $n^2$, where n is the refractive index of the material forming the optical coupling system. In various implementations, the light input surface can be square, rectangular, circular or polygonal. In various implementations, the light redirecting element can include an etendue preserving reflector. The light redirecting element can include a reflecting surface. The reflecting surface can have a polynomially shaped cross-section. The reflecting surface can be configured to redirect a first portion of light incident thereon and transmit a portion of light incident thereon. The reflecting surface can include a plurality of optical apertures configured to transmit light. The light redirecting element can include an input aperture of the light guide. The light redirecting element can include a cylindrical light output surface configured to couple light into a cylindrical input surface of the light guide. The light redirecting element can include a rectangular light output surface that is configured to couple light into a rectangular input surface of the light guide. In various implementations, the light guide has a shape of a tapered disc, wherein the light redirecting element is disposed in the interior of the disc. In such implementations, the output aperture of the optical coupling system can be in the interior of the disc. In various implementations, the light redirecting element can be a curved reflector that is configured to emit redirected light along substantially radial directions within the disc.

Another innovative aspect of the subject matter described in this disclosure can be implemented in an optical system including a means for coupling light and a means for receiving light. The light coupling means include a light input surface configured to receive incident light through an input aperture; and a light output surface configured to emit the incident light through an output aperture having an area smaller than an area of the input aperture. The light coupling means can be configured to couple to a means for emitting light. The light emitting means can be separated from the light input surface by a gap. The gap can include a medium having lower refractive index than the refractive index of material forming the light coupling means. The light receiving means is optically coupled to the light output surface of the light coupling means. The light receiving means includes a means for redirecting light that is configured to receive light from the light output surface of the light coupling means along an incident direction and redirect the light along an output direction that is at an angle with respect to the incident direction. The light receiving means further includes a means for guiding light configured to internally propagate the redirected light. A material of the light receiving means that is optically coupled with the output aperture has substantially the same refractive index as material of the light coupling means. The light coupling means is configured to preserve etendue of the light emitted from the output surface relative to the etendue of light incident on the input surface of the light coupling means. In various implementations, the light coupling means can include an optical coupling system, the light receiving means can include a light receiving system and the light guiding means can include a light guide. A ratio of the area of the input aperture to the area of the output aperture can be approximately $n^2$, where n is the refractive index of the material forming the coupler.

Another innovative aspect of the implementations described herein includes a method of manufacturing an optical system. The method includes providing an optical coupling system including a light input surface configured to receive incident light through an input aperture; and a light output surface configured to emit the incident light through an output aperture having an area smaller than an area of the input aperture. The optical coupling system is configured to couple to an optical source separated from the light input surface by a gap. The gap can include a medium having lower refractive index than the refractive index of material forming the optical coupling system. The method further includes providing an optical receiving system optically coupled to the light output surface of the optical coupling system. The optical receiving system includes a light redirecting element configured to receive light from the light output surface of the optical coupling system along an incident direction and redirect the light along an output direction that is at an angle with respect to the incident direction; and a light guide configured to internally propagate the redirected light. A material of the optical receiving system optically coupling with the output aperture has substantially the same refractive index as material of the optical coupling system. The optical coupling system can be configured to preserve etendue of the light emitted from the output surface relative to the etendue of light incident on the input surface of the optical coupling system. In various implementations, a ratio of the area of the input aperture to the area of the output aperture can be approximately $n^2$, where n is the refractive index of the material forming the optical coupling system.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Example implementations disclosed herein are illustrated in the accompanying schematic drawings, which are for illustrative purposes only.

FIGS. 3C, 3D and 3E illustrate implementations of light redirecting elements with curved sidewalls that may be a part of the light receiving system. FIG. 3E also illustrates the redirection property of an implementation of a radially symmetric light redirecting element for light incident along various incident directions.

FIG. 4A-2 illustrates a top perspective view of an implementation of the circular light guide. FIG. 4A-3 illustrates a cross-sectional perspective view of a tapered circular light guide, one surface of which is combined adhesively with a radially facetted reflective film.

FIG. 4B-1 illustrates an implementation of the light receiving system including a bi-directional redirecting element with two rectangular light output surfaces as shown in FIG. 3D, each of the rectangular light output surface coupled to a light guide.

FIGS. 4B-2-4B-6 schematically illustrate several different implementations of a tapered light guide that is configured to be coupled to one of the rectangular light output surface of the bi-directional light redirecting element.

FIG. 6 illustrates a symmetrical two-stage optical coupling system that is configured to couple light from an optical source including one or more optical sources that are positioned inside a dome shaped hemispherical lens.

Like reference numbers and designations in the various drawings indicate like elements.

DETAILED DESCRIPTION

Figure 1A:
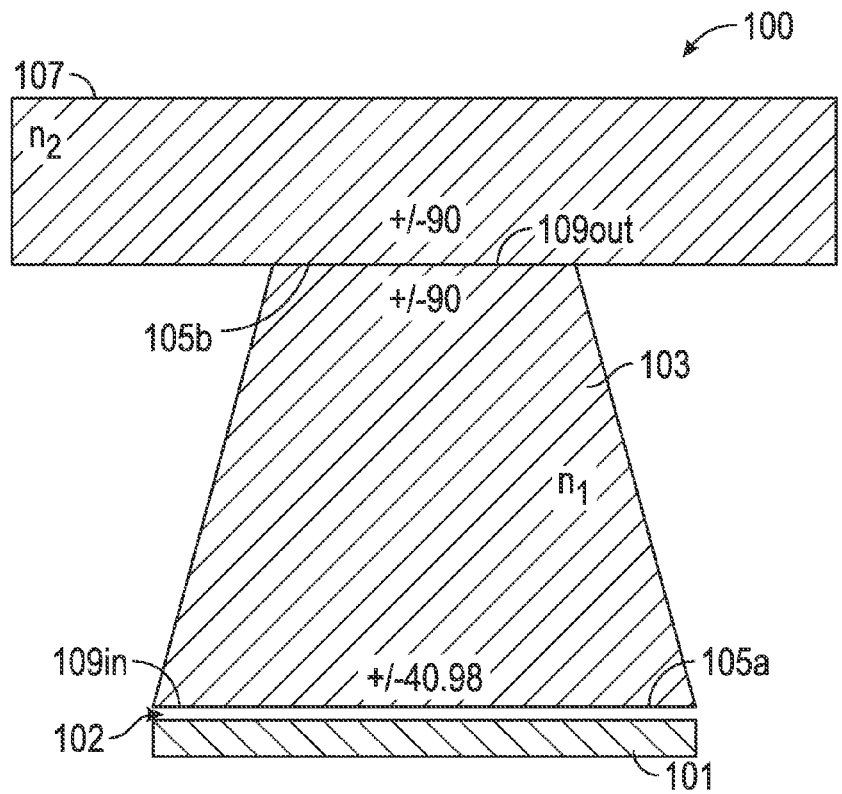
FIG. 1A illustrates the cross-section of an optical system including an etendue-preserving optical coupling system having an input surface associated with an input aperture and an output surface associated with an output aperture.

The following detailed description is directed to certain implementations for the purposes of describing the innovative aspects. However, the teachings herein can be applied in a multitude of different ways. As will be apparent from the following description, the innovative aspects may be implemented in any device that is configured to provide illumination. More particularly, it is contemplated that the innovative aspects may be implemented in or associated with a variety of applications such as commercial or residential lighting. Implementations may include but are not limited to lighting in homes, offices, schools, manufacturing facilities, retail locations, restaurants, clubs, hospitals and clinics, convention centers, hotels, libraries, museums, cultural institutions, government buildings, warehouses, military installations, research facilities, gymnasiums, sports arenas, backlighting for displays, signage, billboards or lighting in other types of environments or applications. Additionally, illumination systems including various implementations of luminaires including etendue preserving optical coupling systems described herein can be incorporated in or used as a building material, such as, for example, walls, floors, ceilings of residential and commercial structures. Other uses are also possible. Thus, the teachings are not intended to be limited to the implementations depicted solely in the Figures, but instead have wide applicability as will be readily apparent to one having ordinary skill in the art.

As discussed more fully below, various implementations described herein include illumination systems including light receiving systems coupled to an optical source (a source of optical radiation) via an optical coupling system. The optical source may include one or more discrete optical sources (e.g., LED emitters). In various implementations, the optical coupling systems can have an entrance aperture that is smaller than the output aperture of the optical source. In other implementations, the entrance aperture may be sized to match that of the output aperture of the source, or in some cases, may be made slightly larger. Various implementations of optical coupling systems and light receiving systems can be configured to guide light. Various implementations of light receiving systems can include thin light guides (e.g., tapered light guides). In such systems, the optical coupling system is configured to have an output aperture that is smaller in aperture area than the input aperture of the optical coupling system to achieve more efficient coupling of light emitted from the optical source to the light receiving system. Implementations of optical coupling systems described herein can transform the effective coupling area of the optical source from the physical size of the area covered by the optical source to a smaller area without violating any laws of physics. Implementations of optical coupling systems described herein can also be configured to mix or homogenize (spatially and/or angularly) the light output from the optical source. For example, the light from an array of LEDs that emit light of different wavelengths (e.g., white, red, blue, lime green, and amber) can be mixed or homogenized by the collective action of the optical coupling system to reduce color non-uniformity.

Illumination systems that are light, compact, and energy efficient are desirable in various light applications. The sizes and weights of illumination systems can be reduced by utilizing light guiding systems with thin light guides and optical sources including an array of LEDs. In such systems, the optical coupling efficiency can be increased when the output aperture of the optical source is configured to have a size that is equal to or less than the size of the optimum entrance aperture of thin light guides. The size of the output aperture of the optical source can depend on the number of LEDs included, the size of the LEDs, and/or the dimensions of lenses and other optical components that may be used to tailor the radiation pattern emitted from the optical source. In various implementations, the optical source can be configured to have an output aperture that is equal to or smaller than the entrance aperture of thin light guides by reducing the size, the number and/or the geometry of the LEDs so that coupling efficiency can be increased, however reducing size, the number and/or the geometry of the LEDs can reduce the brightness of the light emitted from the optical source. Certain implementations of optical coupling systems described herein can advantageously decrease the effective aperture of the optical source to match the entrance aperture of light receiving systems including thin light guiding systems or to which it is coupled without sacrificing the brightness of the optical source. Furthermore, the implementations of optical coupling systems described herein can reduce non-uniformities in color and/or intensity at the entrance aperture of light receiving systems including thin light guiding systems and/or in the near field and far field radiation pattern of light emitted from the output aperture of the light receiving systems including thin light guiding systems.

Implementations disclosed herein include a new class of thin, e.g., plate-like, illumination systems (also, luminaires, illumination devices, lighting devices, and lighting fixtures) that can output light beams with light distribution patterns that have a square, rectangular, circular, or some other cross-sectional shape. The light from the output light beams can be distributed uniformly over enlarged output apertures of reduced brightness. In some implementations, such uniformity is achieved while the light output remains sharply defined and well-directed from +/−5- to +/−60 degrees in each meridian, including all asymmetric combinations in between. Such illumination systems can satisfy a wide range of general lighting services, including wide area lighting, spot lighting, flood lighting, task lighting, and wall washing (or grazing).

In some implementations, a lighting device or illumination device can include a light guide (e.g., a light guiding plate or a tapered light guiding plate), an optical source configured to provide light to the entrance aperture of the light guide, and an optical coupling system disposed in an optical path between the optical source and the entrance aperture of the light guide. Some implementations can include an optical conditioner disposed with respect to an output illumination surface (e.g., above or below) of the light guide, for example, a prismatic light turning film or lenticular light spreading film. In some implementations, the illumination systems can be sized and/or shaped to fit within the recess of a standard lighting fixture, for example, a recess for a parabolic aluminized reflector ("PAR") fixture. In other implementations, the illumination systems can be differently sized and/or shaped than a standard lighting fixture recess such that the light guide does not fit within the recess or such that the light guide fits in the recess with clearance on one or more sides. In other cases, the illumination systems can be configured with their own packaging serving as a lighting fixture, such as in the case of various forms of suspended downlights.

Although various implementations disclosed herein include semiconductor light emitting diodes (or LEDs) this disclosure contemplates the use of other light emitting devices such as, for example, organic LEDs (referred to as OLED), thin flat fluorescent sources, semiconductor laser diodes and flat micro plasma discharge sources, to mention a few. Such other light emitting devices may be utilized in place of, or in conjunction with, the LEDs described herein.

The illumination systems and luminaire's disclosed herein can include commercial LED emitters with appropriate heat extraction means, associated optical coupling systems, associated light distributing optics, and optional light spreading elements. Further, the implementations disclosed herein can include electronics (e.g., low voltage DC power control electronics, as well as various microprocessors, transmitters, receivers, and sensors). The illumination systems and luminaire's disclosed herein can be configured as packaged sources of far-field illumination whose total package cross-sectional thickness is less than about 1-inch. Additionally, illumination systems and luminaire's disclosed herein can be adapted to dilute the LED's high brightness levels, without losing other favorable lighting characteristics, such as tightly controlled beams of illumination and well-defined illumination patterns, so as to provide lighting fixtures with less aperture glare.

Implementations of lighting systems and luminaire's disclosed herein can be compact in their physical size. For example, the size of various implementations of lighting systems and luminaire's disclosed herein disclosed herein can be between approximately 2.5 inches×2.5 inches. In other forms they can be 2 inches×12 inches or 2 inches×24 inches. Implementations of optical coupling systems and light receiving systems disclosed herein can have small cross-sectional thickness. For example, the thickness of optical coupling systems and light receiving systems themselves can be between approximately 5-10 mm. Although, in applications, that are not constrained by overall thickness, the light receiving systems can be substantially thicker. Additionally, as noted above, the light output from the optical source and the optical coupling systems and light receiving systems is not limited by the physical size of the optical source and the optical coupling systems and light receiving systems and can range from hundreds of lumens per luminaire to thousands. In various implementations, the resulting output illumination can be constrained to beams organized as tightly as +/−5 degrees, as broadly as +/−60 degrees, or as any asymmetric combination in between. The beams that are output from the illumination systems and luminaire's disclosed herein can have a sharp enough angular cutoff to reduce off-angle glare (i.e., veiling glare) along with the spatially-even square, rectangular and circular far-field illumination patterns sought by lighting architects and users alike. An attribute of the illumination systems disclosed herein is that their total output lumens are spread over the system's enlarged output apertures so as to reduce aperture brightness, and thereby reduce disability glare to viewers who view the illumination system's far-field beam itself.

Various implementations of lighting systems and luminaire's described herein may be integrated within the physical body thickness of common building materials (as are used in forming commercial ceilings and walls), electrically interconnected, and electronically controlled (individually and as an interconnected distribution).

Various implementations disclosed herein include an optical coupling system that couples light from an optical source including an array of LED's having an output aperture to a light receiving system having an input aperture that is smaller than the output aperture of the optical source. Without any loss of generality, the input aperture of the light receiving system can be smaller than the physical dimensions of the array of LEDs by a factor equal to approximately the square of the refractive index of the light receiving system. Implementations of the optical coupling system disclosed herein include a light receiving surface that is configured to receive light emitted from the optical source and a light output surface that is configured to emit the received light towards and within the light receiving system. The input surface of the optical coupling system can be associated with an input aperture through which light incident on the light input surface enters the optical coupling system. The light output surface of the optical coupling system is associated with an output aperture through which light exits the optical coupling system. In various implementations, the input aperture of the optical coupling system can be configured to have a size that is equal to or smaller than a size of the output aperture of the optical source. It is noted that although the input aperture of the optical coupling system can be smaller than, larger than or have the same size as the output aperture of the optical source, flux efficiency is increased when the size of the output aperture of the optical source is smaller than or matched to the size of the input aperture. However, making the size of the output aperture of the source smaller than the size of the input aperture of the optical coupling system can waste etendue, which may be undesirable in various applications.

In various implementations, the output aperture of the optical coupling system can be configured to have a size that is smaller than a size of the output aperture of the optical source. In various implementations, the size of the output aperture of the optical coupling system can be smaller than the size of the output aperture of the optical source by a factor equal to approximately the square of the refractive index of the material of the optical coupling system. In various implementations, the refractive index of the material of the light receiving system can be equal to or substantially same as the refractive index of the optical coupling system, e.g., the refractive index of the material forming the optical coupling system is selected to be as close as possible to that the refractive index of the light receiving system. For example, the refractive index of the material forming the light receiving system can be equal to the refractive index of the material forming the optical coupling system ±0.01. When the refractive indices of the optical coupling system and the light receiving system are not substantially the same, Fresnel reflections can occur at the interface between the optical coupling system and the light receiving system, which can lower the coupling efficiency. The Fresnel reflections can become more pronounced as the angle of incidence measured from the normal to the interface increases.

As an example, consider that a difference in the refractive index of the material of the optical coupling system and the material of the light receiving system is 0.01. In such implementations, there will be little to no Fresnel reflections for light incident at angles between about 0 degrees and about 60 degrees with respect to the normal to the interface between the optical coupling system and the light receiving system. In such implementations, the amount of light incident at an angle of about 80 degrees with respect to the normal to the interface between the optical coupling system and the light receiving system that is Fresnel reflected is less than 1%. In contrast, about 2% of light incident at an angle of about 80 degrees with respect to the normal to the interface between the optical coupling system and the light receiving system is Fresnel reflected when the refractive index difference between the material of the optical coupling system and the material of the light receiving system doubles to 0.02. The amount of light incident at an angle of about 80 degrees with respect to the normal to the interface between the optical coupling system and the light receiving system that is Fresnel reflected increases to about 4% and 6% when the refractive index difference between the material of the optical coupling system and the material of the light receiving system increases to 0.03 and 0.04 respectively. The fraction of light that is Fresnel reflected at the interface between the optical coupling system and the light receiving system reduces the amount of light transmitted across the interface. This can be undesirable for various applications. In various implementations, anti-reflection coatings may be provided to reduce Fresnel reflections and losses arising from Fresnel reflections. However, providing anti-reflection coatings can increase manufacturing costs and complexity. The optical coupling system is configured such that the etendue of the incident light is preserved as light propagates through the optical coupling system from the input surface to the output surface.

Figure 1B:
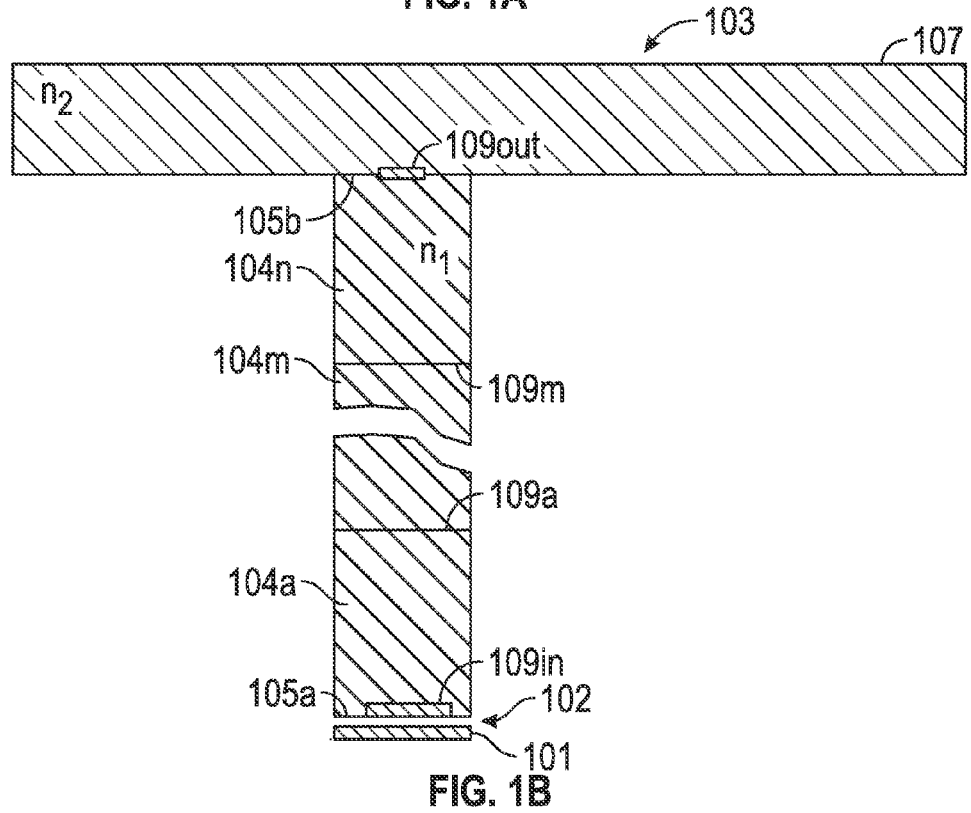
FIG. 1B illustrates another implementation of the etendue-preserving optical coupling system 103 including a plurality of intermediate apertures.

FIG. 1A schematically illustrates a cross-sectional view of an optical system 100 including an etendue-preserving optical coupling system 103 having an input surface 105a associated with an input aperture 109in disposed across a small air gap 102 with an optical source 101 and an output surface 105b associated with an output aperture 109out that is optically coupled to a receiving optical system 107. As discussed below, in various implementations, the input surface 105a and the input aperture 109in can be identical. As discussed below, in various implementations, the output surface 105b and the output aperture 109out can be identical. FIG. 1B illustrates an example of an implementation of the etendue-preserving optical coupling system 103 including a plurality of intermediate apertures. The optical coupling system 103 is configured to be coupled to an optical source 101 such that light from the optical source 101 is incident on the input surface 105a of the optical coupling system 103. The output surface 105b of the optical coupling system 103 is configured to be optically coupled to a light receiving system 107.

Figures 1, 4A:
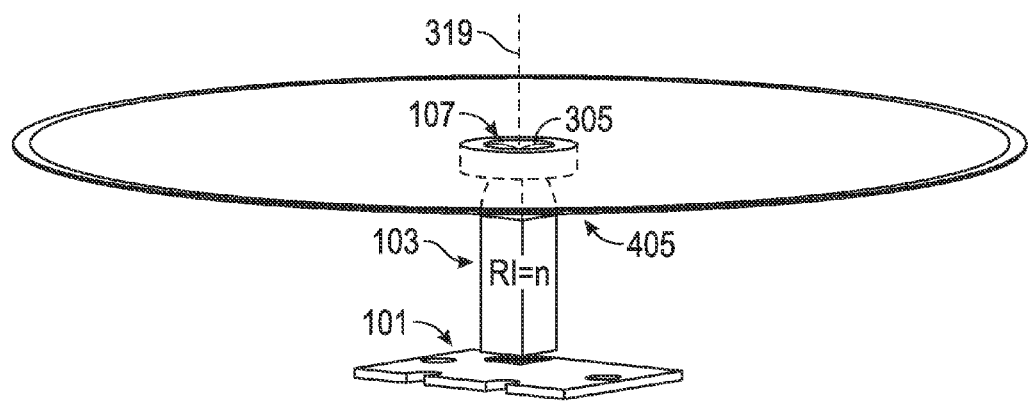
FIG. 4A-1 illustrates an implementation of an optical receiving system including a circular light guide coupled to an implementation of the radially symmetric light redirecting element illustrated in FIG. 3C.
Figures 2, 4A:
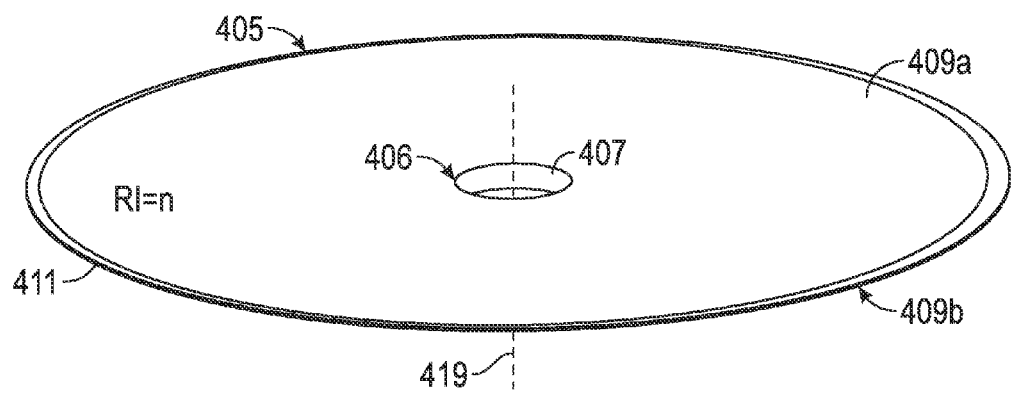
Figures 3, 4A:
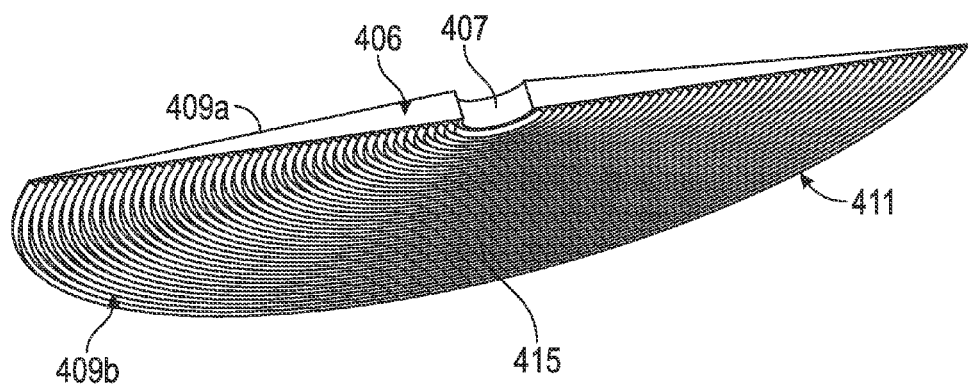
Figures 1, 4B:
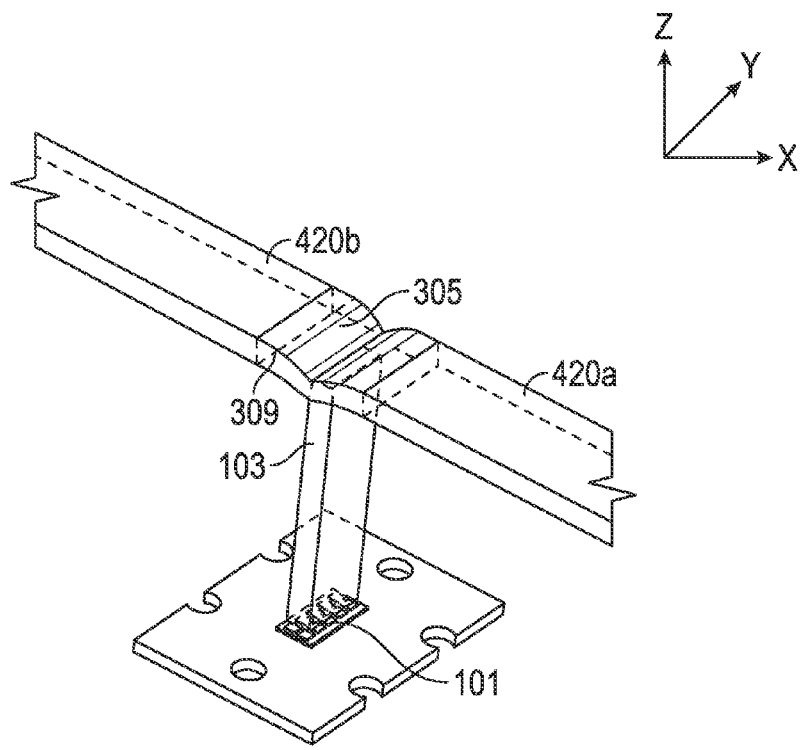
Figures 2, 4B:
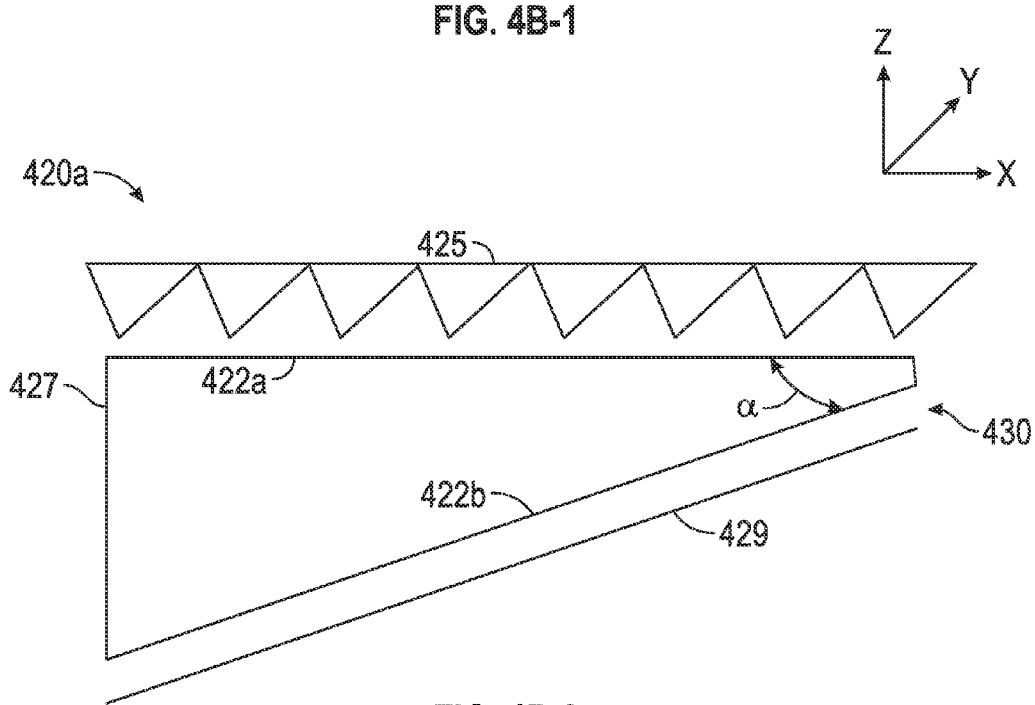
Figures 3, 4B:
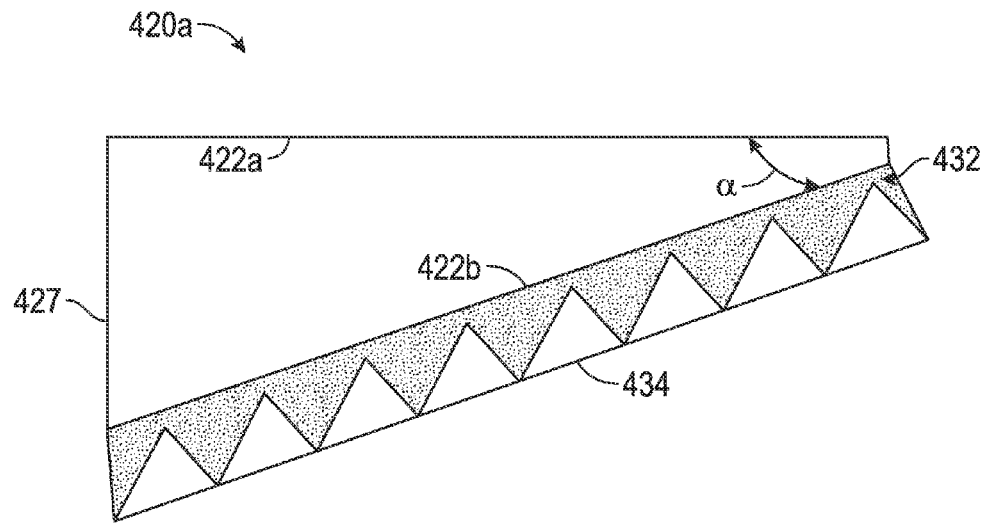

The optical source 101 can include one or more LEDs. In various implementations, the one or more LEDs can be monochromatic emitters that emit light having a single wavelength. In various implementations, the optical source 101 can include LEDs that can emit light with different wavelengths, e.g., wavelengths corresponding to different colors which may be mixed to provide "white" light or light of any combination of wavelengths that are homogeneously-mixed. The one or more LEDs in the optical source 101 can be disposed on a substrate that provides electrical power to the one or more LEDs. The substrate can also include heat sinks to dissipate heat. The optical coupling system 103 is configured to be coupled to the optical source 101 such that the optical coupling system 103 is spaced apart from the optical source 101 device by a gap 102. The gap 102 can be filled with a material having a lower refractive index than the material of the optical coupling system 103. For example, the gap between the optical source 101 and the optical coupling system 103 can include air. In various implementations, the optical source 101 can include one or more optical components disposed over the one or more LEDs. For example, the optical source 101 can include a hemispherical dome lens having a diameter D disposed over the one or more LEDs, such as for example, as shown in FIG. 6. As another example, a reflective element may be disposed around the one or more LEDs to reduce optical loss.

The optical coupling system 103 can include an optically transmissive dielectric material having a refractive index n1 greater than 1. For example, the optical coupling system 103 can include materials such as PMMA, glass, polycarbonate, ZEONEX™, acrylic or any other optical grade polymeric material. As another example, the optical coupling system 103 can include a dielectric material having refractive index n1 in the range between 1.3 and 1.7. In various implementations, the optical coupling system 103 can be solid such that the entire volume of the optical coupling system 103 includes one or more dielectric materials having refractive index greater than 1. In some implementations, the optical coupling system 103 can be a hollow tube. For example, the optical coupling system 103 can be a hollow tube made of a dielectric material whose internal volume includes air or a material having a refractive index lower than the refractive index of the dielectric material. The optical coupling system 103 can be manufactured using methods such as molding, injection molding, casting, etc.

The input surface 105a of the optical coupling system 103 can have a cross-sectional shape that is circular, rectangular, square or some other shape. The output surface 105b of the optical coupling system 103 can have a cross-sectional shape that is circular, rectangular, square or some other shape. As discussed above, the input surface 105a is associated with an input aperture 109in through which light from the optical source 101 enters the optical coupling system 103 and the output surface 105b is associated with an output aperture 109out through which light from optical coupling system 103 is ejected out. The shape and size of the input and output apertures 109in and 109out can be substantially similar to the shape of the corresponding input and output surface 105a and 105b respectively. In some implementations, the shape and size of the input and output apertures 109in and 109out can be different from the shape of the corresponding input and output surface 105a and 105b. For example, the size of the input aperture 109in can be smaller than the size of the input surface 105a and/or the size of the output aperture 109out can be smaller than the size of the input surface 105a, as shown in FIG. 1B. As another example, the shape of the input aperture can be different from the shape of the input surface 105a and/or the shape of the output surface 105b can be different from the shape of the output aperture.

Various implementations of the optical coupling system 103 can include a plurality of coupling sections, such as, for example, coupling sections 104a, 104m and 104n, as shown in FIG. 1B. Each coupling section can be associated with an intermediate aperture, such as, for example, 109a and 109m, as shown in FIG. 1B. The sizes and/or the shapes of the intermediate apertures of the optical coupling system 103 can be same as or different from the size and/or shape of the input aperture associated with the input surface 105a. In various implementations, the sizes and/or the shapes of the intermediate apertures of the optical coupling system 103 can be same as or different from the size and/or shape of the output aperture associated with the output surface 105b.

In some implementations, the optical coupling system 103 can be a monolithic optical component that includes a unitary body. In such implementations, the division between the different coupling sections is not physical but conceptual and used for the purposes of simulating or analyzing propagation of light through the optical coupling system 103. However, in other implementations, the different coupling sections can be physically distinct and the optical coupling system 103 can be manufactured by integrating the different coupling sections together. The different coupling sections can include the same material such that the refractive index of all the coupling sections is equal. In implementations of optical coupling systems including physically distinct coupling sections, the gap between consecutive coupling sections can be filled with a material having a refractive index that is similar to the refractive index of the material of the one or both of the consecutive coupling sections (e.g., an index-matched adhesive). For example, the difference between the refractive index of the material filling the gap between consecutive coupling sections and the refractive index of the material of the consecutive coupling sections can be less than 0.01. In various implementations, the refractive index of the material filling the gap between consecutive coupling sections can be selected such that Fresnel reflections at the interface between consecutive coupling sections is reduced to increase coupling efficiency.

In various implementations of the optical coupling system 103, the input surface 105a, the output surface 105b and/or the sidewalls of the optical coupling system 103 between the input surface 105a and the output surface 105b can be partially or completely covered with a reflective material such as silver, aluminum or enhanced specular reflector (ESR) films such as those distributed by 3M corporation, for example. Reflective material disposed adjacent to and surrounding the input surface 105a, the output surface 105b and/or the sidewalls of the optical coupling system 103 can reduce leakage of high angle light caused by failure of total internal reflection of light propagating through the optical coupling system 103. FIGS. 2A-2E illustrate different implementations of the optical coupling system 103 including reflective material 112. In each implementation, the reflective material may be separated from the coupling system medium by a small air gap, or may be attached adhesively using an optically clear adhesive polymer having substantially the same refractive index as the material of the optical coupling system 103. For example, a difference in the refractive index of the adhesive and the material of the optical coupling system 103 can be less than 0.01 in various implementations. In various implementations, the refractive index of the adhesive can be selected to reduce Fresnel reflections and increase transmission through the optical coupling system 103.

Figure 2A:
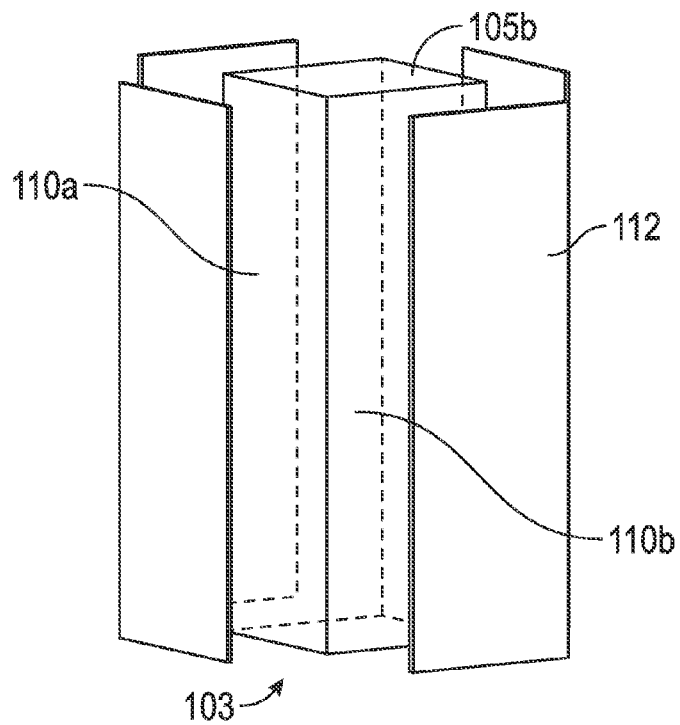
FIGS. 2A-2E illustrate different implementations of the optical coupling system including reflective material.
Figure 2B:
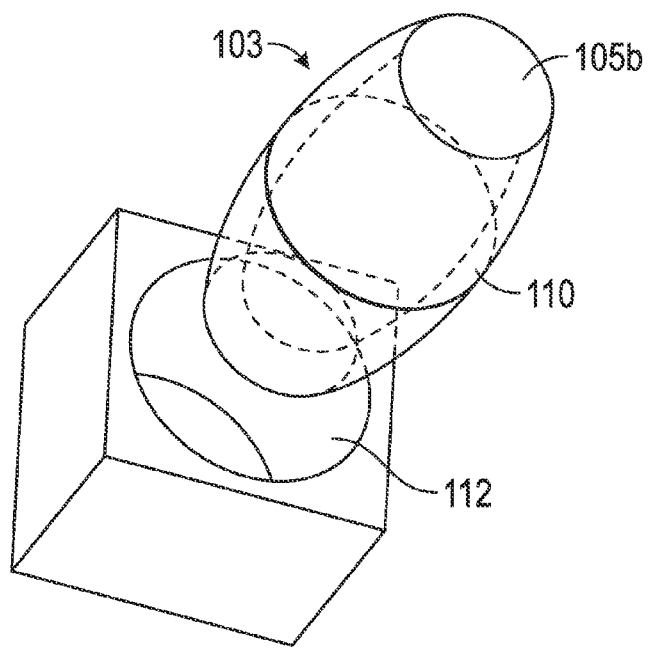
Figure 2C:
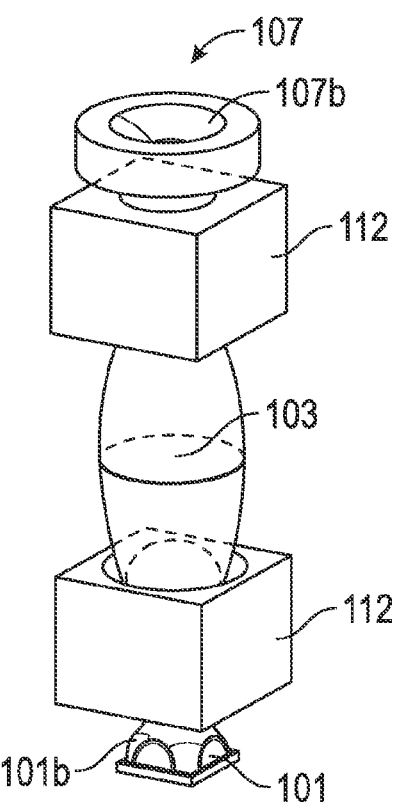
Figure 2D:
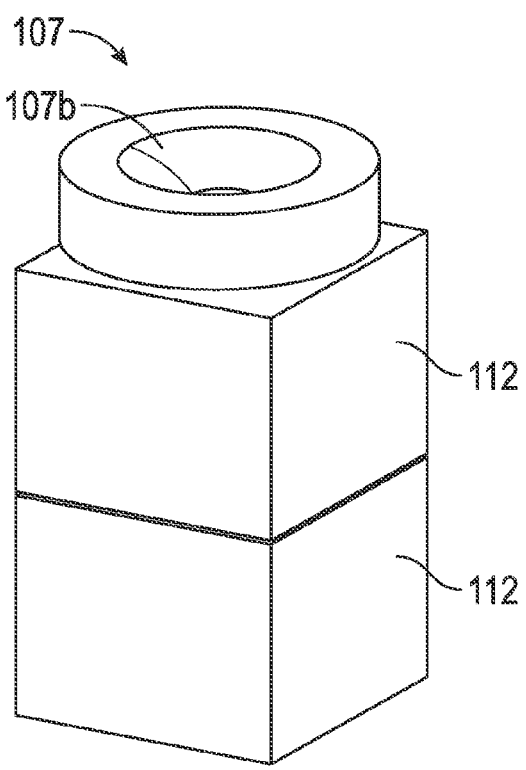
Figure 2E:
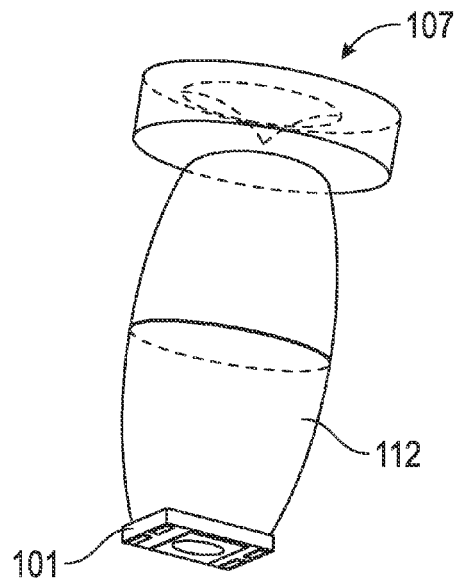

FIG. 2A illustrates an implementation of a rod shaped optical coupling system 103 having a square shaped output aperture 105b. Reflective material 112 (e.g., reflective films) are disposed adjacent the rectangular sidewalls 110a and 110b of the rod shaped optical coupling system 103. FIG. 2B illustrates an implementation of an optical coupling system 103 having a circular output aperture 105b. The optical coupling system 103 includes a hollow conformal reflector including a reflective material 112 disposed adjacent the input surface of the optical coupling system 103. A hollow conformal reflector including a reflective material 112 can also be disposed adjacent the output surface of the optical coupling system 103 illustrated in FIG. 2B, as shown in FIG. 2C. The hollow conformal reflector including a reflective material 112 can be configured to cover the entire side wall of the optical coupling system 103 illustrated in FIG. 2B, as shown in FIGS. 2D and 2E.

The optical source 101 can include a single LED chip or an array of individually controlled LED chips, covered with a clear polymeric hemispherical lens 101b, as shown in FIG. 2C. In various implementations, the input surface 105a of the optical coupling system 103 can be a hemisphere that is sized and shaped to match the clear polymeric hemispherical lens 101b such that the optical source 101 and the input surface of the optical coupling system fit together. In such implementations, the clear polymeric hemispherical lens 101b can be attached to the corresponding hemispherical input surface 105a with an adhesive whose refractive index is matched to the refractive index of the hemispherical lens. To increase the light coupling and transmission efficiency, the refractive index of the material of the optical coupling system 103 is matched as closely as possible to the refractive index of the hemispherical lens, or the refractive index of the hemispherical lens is matched to that of the material of the optical coupling system 103.

Implementations of light receiving system 107 disclosed herein (e.g., illustrated in FIG. 1B) can be configured to receive substantially all light output from the output aperture 109out of the optical coupling system 103 to which they are coupled. Various implementations of light receiving systems disclosed herein can be configured to release to the surrounding environment, which may be air, substantially all light received through the output aperture 109out of the optical coupling system 103 with the exception of material losses. Various implementations of light receiving system 107 can include a radial light guiding system as shown in FIGS. 2C-2E. In various implementations, an upper surface 107b of the light receiving system 107 can be a radially disposed reflecting surface that may (or may not) be coated with a metallic reflecting film made of for example aluminum or silver. The optical density of the light receiving system can be varied by varying the thickness of the reflecting film. For example, the optical density of the light receiving system 107 can be varied between OD0.5 to OD3 depending on the thickness of the reflecting film. This radially disposed reflecting surface can be generally considered as a light redirecting element that redirects light by at least one of the following phenomenon: total internal reflection at a polymer-air interface, total internal reflection at a polymer-polymer interface wherein each polymer medium has a different refractive index, and total internal reflection at a polymer-metal interface. The light receiving system 107 can be configured to be optically coupled to output surface 105b (corresponding to the output aperture 109out) so as to receive the full angular distribution of the light transmitted out from the optical coupling system 103.

Figure 3A:
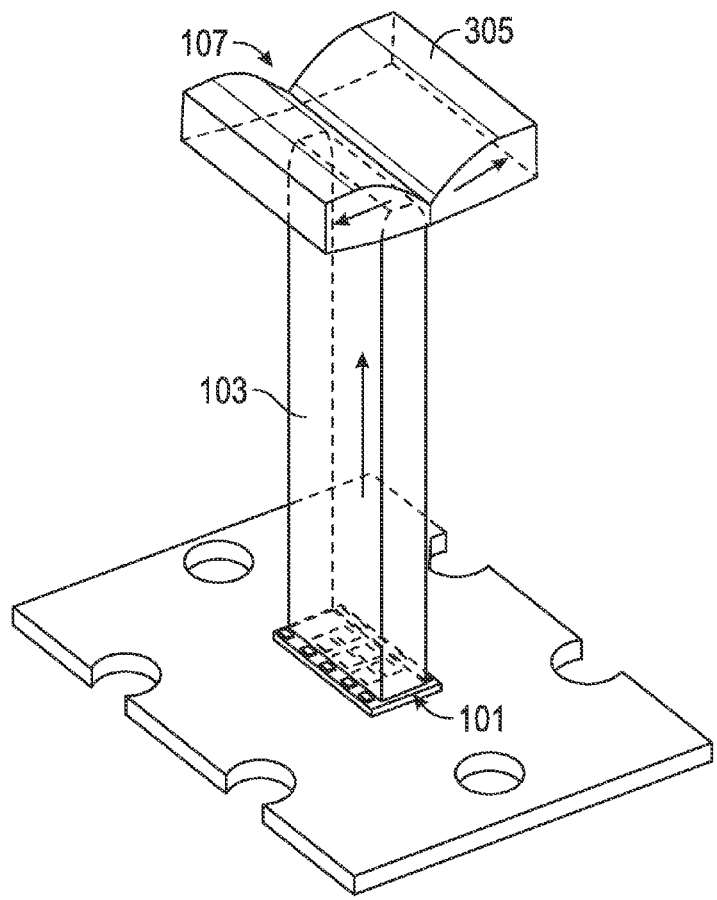
FIGS. 3A, 3B, 3C and 3D illustrate several implementations of the light receiving system that is optically coupled with the output surface of various implementations of the optical coupling system.
Figure 3B:
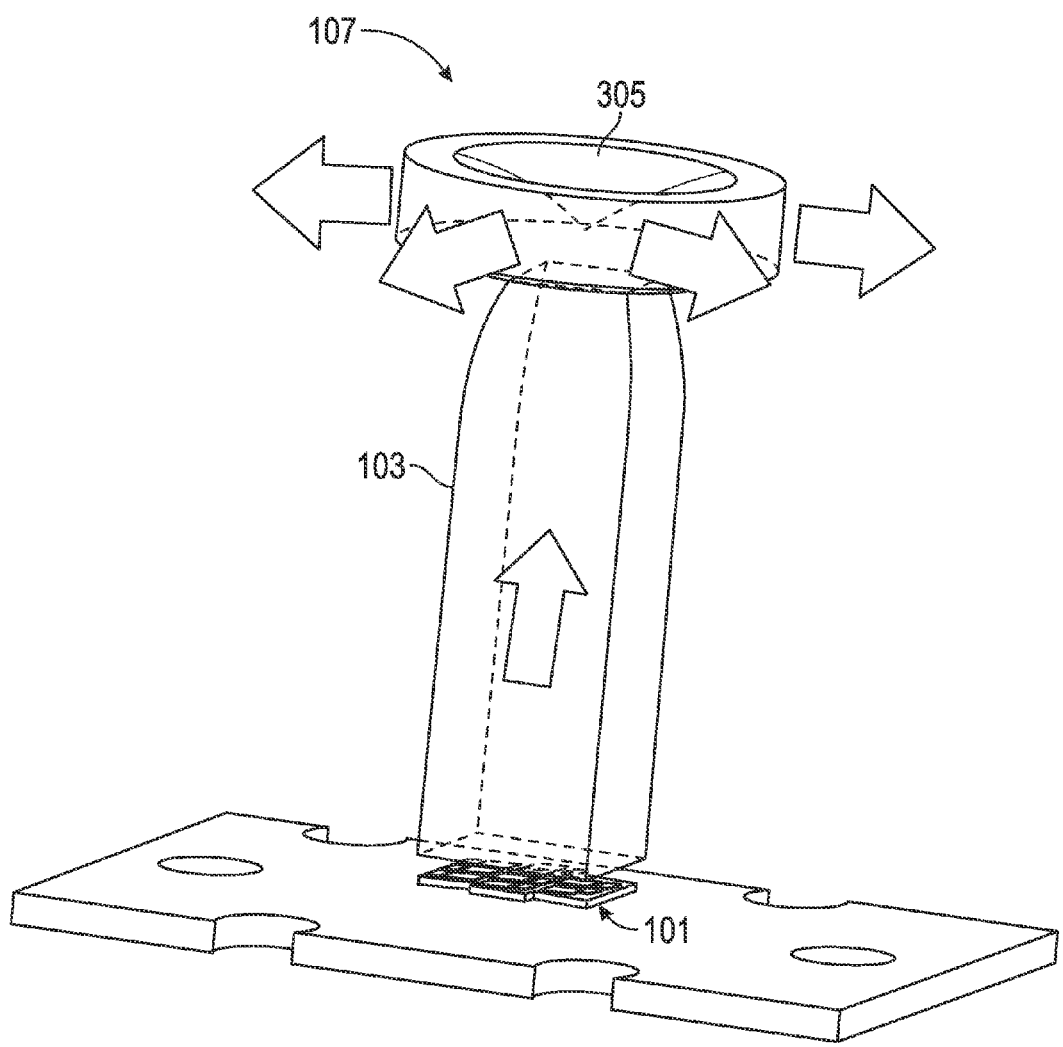

FIGS. 3A and 3B illustrate further implementations of the light receiving system 107 that is optically coupled with the output surface of the optical coupling system 103. The light receiving system 107 includes a dielectric material having a refractive index n2. In various implementations, the refractive index n2 of the dielectric material of the light receiving system 107 can be substantially similar to or identical to the refractive index n1 of the dielectric material of the optical coupling system 103. In various implementations, the light receiving system 107 can include the same material as the optical coupling system 103. The light receiving system 107 and the optical coupling system 103 can be monolithically integrated together to form a unitary body. In some implementations, the light receiving system 107 can be physically distinct from the optical coupling system 103 and can be attached to the output surface 105b of the optical coupling system 103 with a material (e.g., index matching gel or pressure sensitive adhesive (PSA)) that has substantially similar refractive index as the material of the optical coupling system 103 and the light receiving system 107.

Figure 3C:
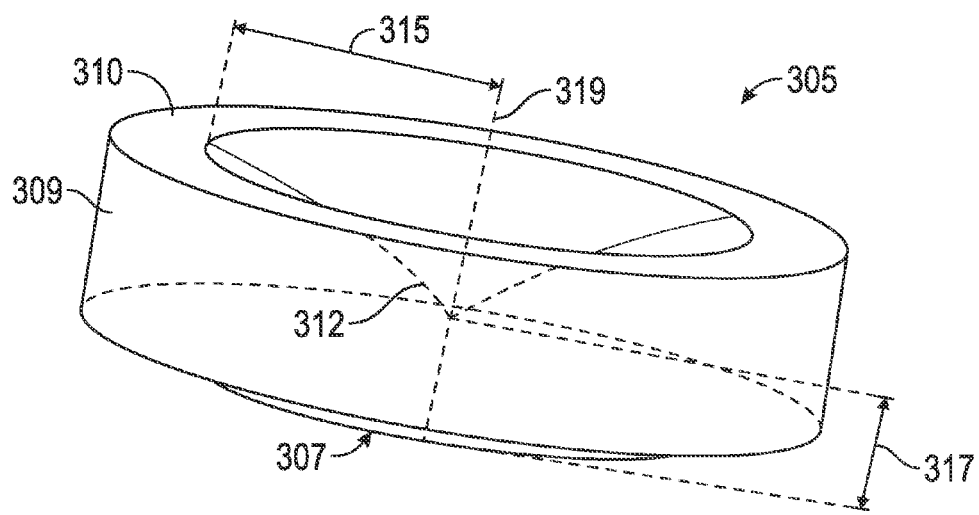
Figure 3D:
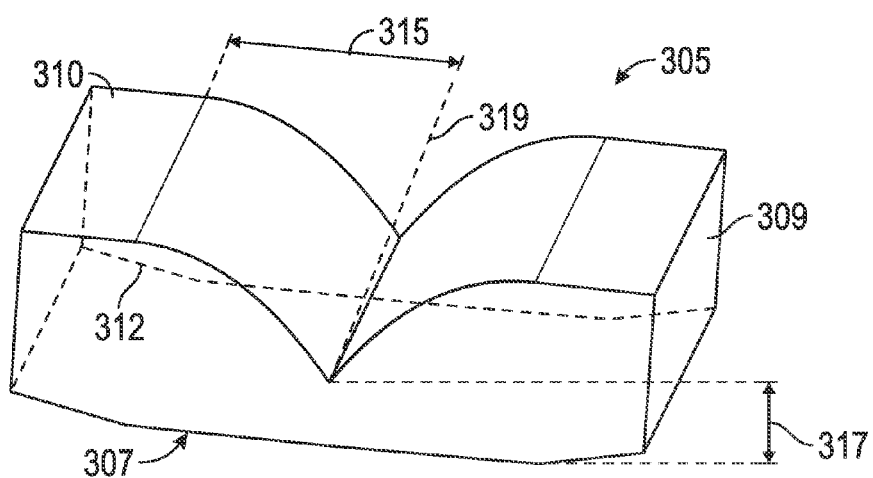

The light receiving system 107 can include a light redirecting element 305 that is configured to receive light from the light output surface of the optical coupling system along an incident direction and redirect the received light along an output direction that is at an angle or group of angles with respect to the incident direction. In various implementations, the angle between the incident direction and the output direction can be greater than 0 degrees and less than about 160 degrees. To redirect light along a desired output direction, one or more sidewalls of the light redirecting element 305 can be curved. FIGS. 3C and 3D illustrate implementations of light redirecting elements with curved sidewalls. The light redirecting element 305 includes a light receiving surface 307c, a light output surface 309, and a light redirecting surface 310 opposite the light receiving surface 307. In various implementations, light redirecting surface 310 may be partially or fully coated with a high reflectivity metal film. In other implementations, the metal film may be made partially transparent so as to allow some amount of light to leak out into the surrounding medium. Allowing some amount of light to leak out can prevent the redirecting element from appearing to be dark when viewed in relation to the relative brightness of the surrounding optical system. In various implementations, the surrounding medium may be air.

At least a portion of the light redirecting surface 310 can be curved inwards towards the light receiving surface 307 to form curved sidewalls 312. The curvature of the sidewalls 312 can be determined according to a polynomial equation in some implementations. In various implementations, the sidewalls 312 can include sections of a conic. For example, in various implementations, a portion of the sidewalls can be parabolic. A distance between the intersection of the curved sidewall 312 and the light redirecting surface 310 and an axis 319 normal to the light redirecting surface 310 and intersecting the lowest point of the curved sidewall 312 in the light redirecting element 305 can be referred to as the radial extent 315 of the curved sidewall 312. A distance between the light receiving surface 307 and the lowest point of the curved sidewall 312 in the light redirecting element 305 can be referred to as the depth 317. The radial extent 315 of the curved sidewalls 312, the depth 317 of the curved sidewalls 312 and the curvature of the sidewalls 312 can be adjusted to achieve a desired angular distribution of the redirected light along the output direction. In various implementations, the radial extent 315 of the curved sidewalls 312, the depth 317 of the curved sidewalls 312 and the curvature of the sidewalls may be configured with a parabolic profile to provide the most condensed angular cone of light to the light output surface 309. In some implementations, the light redirecting elements can include curved sidewalls having a radial extent that varies from about 2.0 mm to about 4.0 mm and a depth that varies from about 0.1 mm to about 2.7 mm. In various implementations, the light receiving surface 307 of the light redirecting element 305 can be planar. In some implementations, a portion of the light receiving surface 307 of the light redirecting element 305 can also be recessed into light redirecting element 305 or curved into light redirecting element 305. Various implementations of light redirecting elements disclosed herein can be symmetric (e.g., rotationally symmetric) about the axis 319 that is normal to the light redirecting surface 310 and intersect the lowest point of the curved sidewall 312 in the light redirecting element 305.

One or more portions of the curved sidewalls 312 can be configured to be reflective such that light incident from the optical coupling system 103 through the light receiving surface 307 of the light redirection element 305 strikes the curved sidewalls 312 and is redirected out of the light output surface 309 along an output direction that is at an angle with the direction of incident light. For example, as discussed below with reference to FIG. 3E, incident light can be redirected along an output direction that is greater than 0 degrees and less than 160 degrees after striking the curved sidewalls 312. For example, the curved sidewalls 312 can be configured to be reflective by providing high reflectivity metal films or coatings adjacent the curved sidewalls 312. In some implementations, the curved sidewalls 312 can be configured to redirect light incident from the optical coupling system 103 through the light receiving surface 307 of the light redirection element 305 towards the light output surface 309 by total internal reflection within the material of the light redirecting element 305.

However, by directing most or all light incident from the optical coupling system 103 through the light receiving surface 307 of the light redirection element 305 towards the light output surface 309 in this manner can result in a region of decreased light intensity in the center of the light redirecting element 305. The decrease in intensity of light in the center of the light redirecting element 305 can be compensated by allowing some light to be transmitted through the light redirecting element 305. For example, in implementations of light redirecting elements that include a reflective metal film or coating, the thickness of the reflective metal film or coating can be selected to allow some light to be transmitted through the light redirecting element 305. The thickness may be selected based on the desired degree of transmission. For example, the thickness can be selected to achieve a certain optical density using Lambert-Beer's Law which provides the optical density (OD) for a thin film having a certain absorption coefficient and a cross-sectional thickness. As another example, a plurality of transmissive optical apertures (e.g., pinholes, clear openings, etc.) can be provided in the reflective metal film or coating such that a portion of the incident light is transmitted through the optical apertures out of the redirecting element 305.

FIG. 3C illustrates an implementation of a radially symmetric redirecting element 305 having conic sidewalls 312 and a cylindrical light output surface 309 given by a locus of points disposed at a fixed distance from an axis of rotation 319 of the light redirecting element. The radially symmetric redirecting is symmetric about the axis of rotation 319. In various implementations, light incident through the light receiving surface 307 can be redirected along an output direction (or directions) that is at an angle (or angles) with respect to the axis 319. In various implementations, light incident through the light receiving surface 307 can be redirected along an output direction that is radially outward to the light output surface 309, as if emanating from the region of the axis 319 itself. In various implementations, light from the optical coupling system 103 can be incident along a direction that is perpendicular to the light receiving surface 307. In such implementations, the radially symmetric redirecting element 305 can be configured to redirect light incident through the light receiving surface 307 such that the redirected light propagates in planes that are substantially parallel to the light receiving surface 307. Implementations of a radially symmetric redirecting element as shown in FIG. 3C can be useful to couple light into a circular light guide having a central cylindrical light input surface as discussed in detail below with reference to FIG. 4A-1.

Figure 3E:
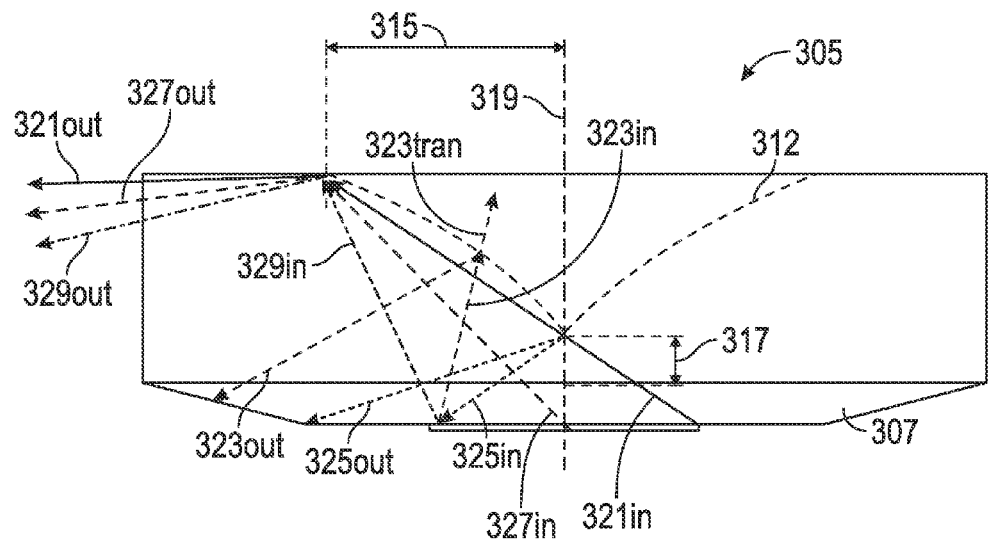

FIG. 3E illustrates the redirection property of an implementation of a radially symmetric light redirecting element for light incident along various incident directions. The implementation of radially symmetric light redirecting element 305 illustrated in FIG. 3E as one particular example has a radial extent 315 of about 3.4 mm and a depth 317 of about 1.1 mm. FIG. 3E shows five incident rays of light 321in, 323in, 325in, 327in and 329in that are incident at various angles with respect to the axis 319. Incident ray 321in is incident at an angle of about 56.5 degrees with respect to the axis 319; incident ray 323in is incident at an angle of about −15 degrees with respect to the axis 319; incident ray 325in is incident at an angle of about −55 degrees with respect to the axis 319; incident ray 327in is incident at an angle of about 45 degrees with respect to the axis 319; and incident ray 329in is incident at an angle of about 25 degrees with respect to the axis 319.

After striking the curved reflective sidewall 312, incident ray 321in is redirected as output ray 321out propagating along an output direction that is about 1.5 degrees with respect to an axis in the plane of the redirecting surface 310. Incident ray 323in is redirected as output ray 323out propagating along an output direction that is about 28.5 degrees with respect to an axis in the plane of the redirecting surface 310. In some implementations, a portion of incident ray 323in may leak through the metallic coating applied to light redirecting surface 310 of the radially symmetric light redirecting element as ray 323tran. Ray 323tran can refract into the adjacent media which may be either air or a polymer. Incident ray 325in is redirected as output ray 325out propagating along an output direction that is about 19.4 degrees with respect to an axis in the plane of the redirecting surface 310. Incident ray 327in is redirected as output ray 327out propagating along an output direction that is about 7.5 degrees with respect to an axis in the plane of the redirecting surface 310. Incident ray 329in is redirected as output ray 329out propagating along an output direction that is about 13 degrees with respect to an axis in the plane of the redirecting surface 310. Accordingly, in the illustrated implementation, the angle between the incident direction and the output direction varies between 15 degrees and 146 degrees. These particular paraxial ray trajectories are purely illustrative of the intended light redirecting nature of a light redirecting element included in a light receiving system that is contemplated by this disclosure.

With reference again to FIG. 3D, FIG. 3D illustrates an implementation of a generally bi-directional light redirecting element 305 having curved sidewalls 312 and a rectangular light output surface 309, in contrast to the radial light redirecting element of FIG. 3C. The light redirection element 305 illustrated in FIG. 3D is configured to redirect light incident through the light receiving surface 307 from the optical coupling system 103 along two diametrically opposed directions. In various implementations, light incident through the light receiving surface 307 can be redirected along an output direction that is radially outward to the light output surface 309. In various implementations, light from the optical coupling system 103 (FIG. 3A) can be incident along a direction that is perpendicular to the light receiving surface 307. In such implementations, the light redirecting element 305 with rectangular light output surfaces as in FIG. 3D can be configured to redirect light incident through the light receiving surface 307 such that the redirected light propagates in directions generally parallel to the light receiving surface 307. Implementations of light redirecting elements that are configured to redirect light along two diametrically opposed directions can be useful in coupling light into two oppositely directed light guides as discussed in detail below with reference to FIG. 4B-1.

In various implementations, the light receiving system 107 can include a light guide that is configured to be optically coupled with the light output surface 309 of the light redirecting element 305 and receive light output from the light output surface 309. FIGS. 4A-1 and 4B-1 illustrate implementations of the light receiving system 107 including light guides.

FIG. 4A-1 illustrates an implementation of a circular light guide 405 coupled to an implementation of the radially symmetric light redirecting element 305 illustrated in FIG. 3C. FIG. 4A-2 illustrates a top perspective view of an implementation of the circular light guide 405. In various implementations, the circular light guide 405 is configured as a disc shaped light guide having a first surface 409a and a second surface 409b opposite the first surface 409a and bounded by a circular periphery 411. The light guide can include a material having a refractive index n3 that is substantially similar to or identical to the refractive index n2 of the light redirecting element 305, which in turn may be substantially similar to or identical to the refractive index n1 of the optical coupling system 103. In various implementations, the circular light guide can include materials similar to the material of the optical coupling system 103. For example, the circular light guide can include materials such as, for example, PMMA, glass, polycarbonate, ZEONEX™, acrylic or any other optical grade polymeric material. An aperture or a hole can be formed in the central portion 406 of the circular light guide 405. The central aperture can be sized and shaped to accommodate the radially symmetric light redirecting element 305 illustrated in FIG. 3C. For example, in various discrete implementations the central aperture can be a cylindrical ring shaped structure having a cylindrical light input surface 407 disposed about an axis of rotation 419 of the circular light guide 405. Without any loss of generality, the axis of rotation 419 of the circular light guide can coincide with the axis of rotation 319 of the radially symmetric light redirecting element. The radially symmetric light redirecting element 305 can be disposed in the central aperture and adhered to the circular light guide 405 by adhesives. In various implementations, the adhesives can have a refractive index that is substantially similar to the refractive index of the material of the circular light guide 405 and the radially symmetric light redirecting element 305. In some implementations, as a choice of manufacturing, the radially symmetric light redirecting element 305 and the circular light guide 405 can be monolithically integrated so as to form a unitary body.

In some implementations, the circular light guide 405 can be tapered such that the first surface 409a and the second surface 409b are inclined with respect to each other to form an angle α between those surfaces. FIG. 4A-3 illustrates a cross-sectional perspective view of a tapered circular light guide 405. In such implementations, the thickness of the circular light guide 405 at the periphery 411 can be less than the thickness of the circular light guide 405 in the central portion 406. In some implementations, the thickness of the circular light guide 405 at the periphery 411 can be such that the periphery 411 forms a knife-edge whose thickness is substantially less than 10% of the cross-sectional thickness at center portion 406. In some implementations, the thickness of the periphery 411 can be as small a fraction of the center portion thickness as is feasible to manufacture.

The angle α between the first surface 409a and the second surface 409b can be greater than about 1 degree and less than about 15 degrees, for example, between about 2 degrees and about 8 degrees (including 2 degrees, 3 degrees, 4 degrees, 5 degrees, 6 degrees, 7 degrees, 8 degrees, or any value between any two of these values). In some implementations, angle α between the first surface 409a and the second surface 409b can be less than about 1 degree, with a corresponding sacrifice in total output efficiency which drops significantly as angle α falls progressively further below about 1 degree. In this way, a maximum longitudinal dimension of the light guiding plate or light guide can be relatively thin, for example, below 50 mm or 2 inches. However, depending upon the taper angle α and the maximum radial dimension, light guiding plates with longitudinal dimensions between about 1 mm and about 16 mm, for example, or between about 2 mm and 6 mm, can be made.

Operationally, light output through the light output surface 309 of the radially symmetric light redirecting element enters the circular light guide 405 through the cylindrical light input surface 407 and propagates along substantially radial directions within the circular light guide through multiple total internal reflections at the first surface 409a and the second surface 409b. In various implementations, light extraction features can be disposed on one of the first or the second surface 409a and 409b of the circular light guide 405 to disrupt the total internal reflection and extract light out of the circular light guide 405. In other implementations, light redirection features can be disposed adjacent the first or the second surface 409a and 409b of the circular light guide 405 to collect and redirect and otherwise extract light that flows out of the first or the second surface 409a and 409b of the circular light guide 405 due to failure of total internal reflection within the light guide. In FIG. 4A-3 as one example, a radially facetted light extraction film 415 whose facets have been coated with a reflective metal is disposed adjacent the planar surface 409b of the tapered circular light guide 405. In some implementations, the light extraction film 415 can be separated by a transparent polymer layer of lower refractive index than that of the circular light guide.

In various implementations, the radially facetted light extraction film 415 can include uncoated light redirection features. Various implementations of the radially facetted light extraction film 415 can be disposed adjacent one of the first or the second surface 409a and 409b of the circular light guide 405 with facets facing the first or second surface 409a and 409b across a small air gap to collect and redirect and otherwise extract light that flows out of the first or the second surface 409a and 409b of the circular light guide 405 due to failure of total internal reflection within the light guide. In such implementations, a reflector (e.g., a plane mirror) can be placed adjacent the second or the first surface 409a and 409b that is opposite to the surface adjacent to the facets. In some implementations, the radially facetted light extraction film 415 can be configured to preserve the collimated output light from the circular light guide 405. Other methods of extracting light without the use of the radially facetted light extraction film 415 can also be employed in various implementations. In some other embodiments, rather than having an attached films, the first surface 409a and/or the second surface 409b may be contoured (e.g., formed or etched to have facets) to provide light extraction.

FIG. 4B-1 illustrates an implementation of the light receiving system 107 including a bi-directional redirecting element with two rectangular light output surfaces as shown in FIG. 3D, each of the rectangular light output surface 309 coupled to a light guide. The light guides 420a and 420b coupled to each rectangular light output surface 309 can be, e.g., planar or wedge shaped light guides. The light guides 420a and 420b coupled to each rectangular light output surface 309 can be identical to each other or be different from each other. The light guides 420a and 420b can include a material having a refractive index n3 that is substantially similar to or identical to the refractive index n2 of the light redirecting element 305 and substantially similar to or identical to the refractive index n1 of the optical coupling system 103. In various implementations, the light guides 420a and 420b can include materials similar to the material of the optical coupling system 103. For example, the light guides 420a and 420b can include materials such as, for example PMMA, glass, polycarbonate, ZEONEX™, acrylic or any other optical grade polymeric material. The bi-directional redirecting element 305 can be adhered to the light guides 420a and 420b by adhesives. In various implementations, the adhesives can have a refractive index that is substantially similar to the refractive index of the material of the light guides 420a and 420b and the bi-directional redirecting element 305. In some implementations, the bi-directional redirecting element 305 and the light guides 420a and 420b can be monolithically integrated so as to form a unitary body.

FIGS. 4B-2-4B-6 schematically illustrate several implementations of a tapered light guide cross-section 420a that is configured to be coupled to one of the rectangular light output surface 309 of the bi-directional light redirecting element 305, when extruded along x-axis in FIG. 4B-1 or when extruded radially about axis 419 in FIG. 4A-2. It is noted that the cross-sections illustrated in FIGS. 4B-2 and 4B-6 are applicable to circular and linear light guides. As such the two-dimensional light guide and light extracting film cross-sections illustrated in FIGS. 4B-2 through 4B-6 can be applied to both linear light guides or circular light guides shown in FIGS. 4A-1-4A-3 and 4B-1. The light guide 420a has a first surface 422a and a second surface 422b opposite the first surface 422a. The first surface 422a can be a planar surface extending in the x-y plane. Without any loss of generality, the first surface 422a can have a square, a rectangular, a trapezoidal or any other cross-sectional shape. The second surface 422b can be inclined with respect to the first surface 422a and forms an angle α with respect to the first surface 422a. The light guide 420a has a light entry surface 427 that is generally sized and shaped to match the rectangular light output surface 309 of the bi-directional light redirecting element. The thickness of the light guide 420a at its periphery can be less than its thickness near the light entry surface 427. The angle α between the first surface 422a and the second surface 422b can be greater than about 1 degree and less than about 15 degrees, for example, between about 2 degrees and about 8 degrees (including 2 degrees, 3 degrees, 4 degrees, 5 degrees, 6 degrees, 7 degrees, 8 degrees, or any value between any two of these values). In various implementations, the angle α can be less than 1 degree when the proportional loss in total output light extraction efficiency that is associated with smaller taper angles α can be tolerated.

Operationally, light output through the light output surface 309 of the bi-directional light redirecting element enters the light guide 420a (or 420b) through the corresponding light entry surface 427 and propagates generally along the x-y plane of the light guide 420a through multiple total internal reflections at the first surface 422a and the second surface 422*b*. As light flows through the light guide, an amount of light can leak out of each of the guide surfaces 422*a* and 422*b* in the surrounding medium due to interruption in total internal reflection of light propagating through the light guide 420*a* brought on by the tapered light guide cross-section. The amount of light that leaks from each of the light guide surface 422*a* and 422*b* is about equal. The light that leaks from each of the light guide surface 422*a* and 422*b* can be collimated in the cross-sectional plane of the light guide.

In implementations that include a reflector 429 (e.g., a plane mirror) that is disposed adjacent one of the light guide surfaces 422*a* or 422*b*, the light extracted from the surface adjacent the reflector 429 (e.g., surface 422*b*) is reflected back into the guide and can be extracted through the light guide surface that is opposite to the reflector 429 (e.g., surface 422*a*) at substantially the same angle as the light extracted through the surface adjacent the reflector 429. The light leaking from the light guide surfaces 422*a* or 422*b* can be collected, redirected and otherwise extracted as a substantially well collimated beam by redirecting features (e.g., facets or prismatic features) incorporated in a light redirecting film 425 that is disposed adjacent the surface opposite the surface that is adjacent the reflector 429. In various implementations, a plurality of light redirecting films can be provided to collect, redirect and/or extract light from the light guide 420*a*. For example, the light guide implementation illustrated in FIG. 4B-4 includes two light redirecting films 425*a* and 425*b* disposed adjacent the light guide surface 422*a*. The second light redirecting film 425*b* can advantageously provide additional amount of angular redirection that achieved by the first light redirecting film 425*a* alone. However, the second light redirecting film 425*b* can also increase Fresnel losses which may not be desirable for some applications.

In various implementations the light redirecting film 425 can be spaced apart from the light guide surface it is adjacent to by a gap 430, as shown in FIG. 4B-2. The gap 4B-2 can include a material with a refractive index that is lower than the refractive index of the material of the light guide 420*a*. For example, the gap 430 can include air. As another example, the gap 4B-2 can include a transparent polymeric material having a refractive index lower than the refractive index of the material of the light guide 420*a*.

FIG. 4B-3 illustrates an implementation of the tapered light guide 420*a* including a transparent polymeric material 432 having a refractive index lower than the refractive index of the material of the light guide 420*a* that is disposed on one of the surfaces (e.g., inclined surface 422*b*) of the tapered light guide 420*a*. In such implementations, one side of the light guide 420*a* can be considered to be bound by a low refractive index material. In such implementations, the conditions for total internal reflection are changed significantly on the light guide surface on which the polymeric material 432 is disposed, such that substantially all the light extraction can occur along the length of the light guide surface on which the polymeric material 432 is disposed and not the other light guide surface. In such implementations, light extraction features 434 can be disposed on or adjacent to the polymeric material 432 to collect, redirect and/or extract light from the light guide 420*a*. In various implementations, the light extraction features 434 can be reflective (e.g., reflective prismatic features) that are configured to receive light that is extracted from the light guide 420*a* and redirect the extracted light via reflection.

Figures 4, 4B:
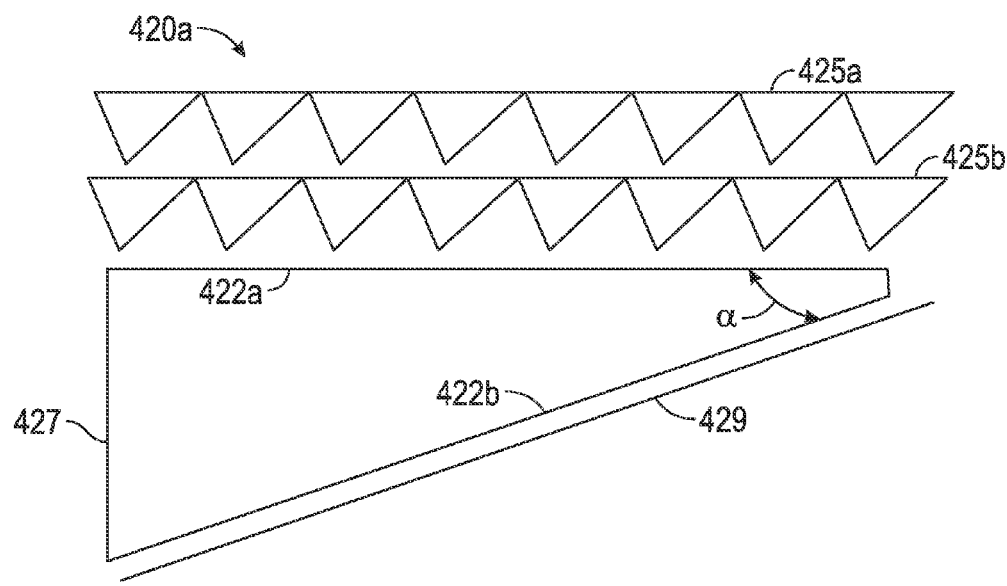
Figures 4, 4B, 5:
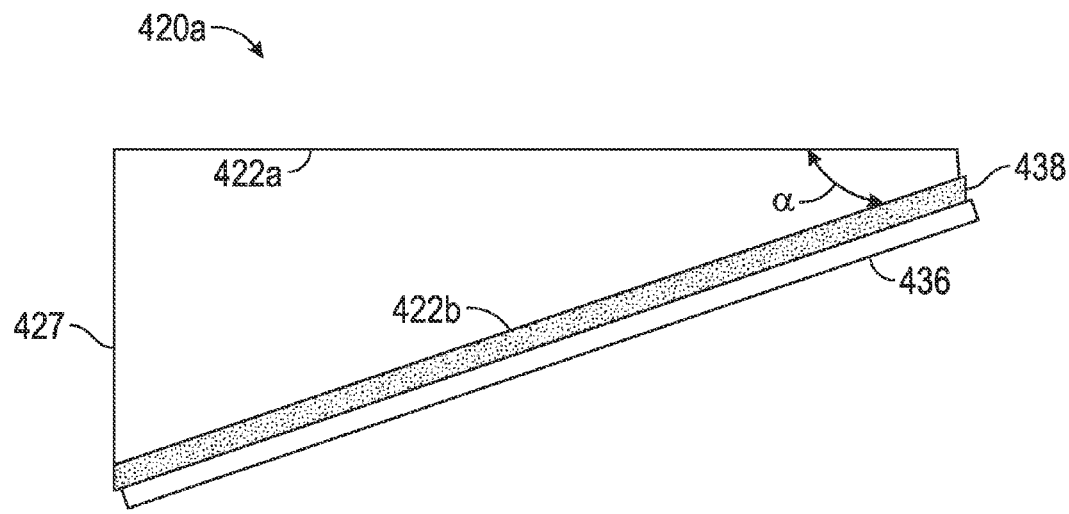
Figures 4, 4B, 5, 6:
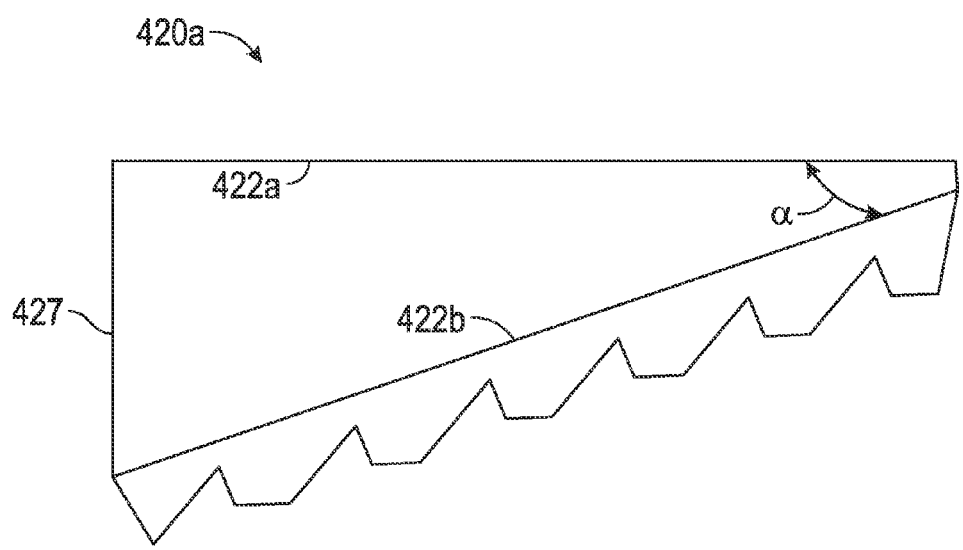

In the implementation illustrated in FIG. 4B-5, a white reflecting film 436 is optically coupled to one of the light guide surfaces (e.g., inclined surface 422*b*) via an optically-clear polymeric adhesive material 438. The refractive index of the adhesive material 438 can be the same or lower than the refractive index of the material of the light guide 420*a*. The adhesive material 438 can be continuous as illustrated in FIG. 4B-5. Alternately, the adhesive material 438 can be discontinuous. For example, in various implementations, the adhesive material 438 can be arranged to form a pattern of adhesive portions that are interspersed with non-adhesive portions. The non-adhesive portions can include air or some other material.

In still other implementations, such as the implementation illustrated in FIG. 4B-6 light extraction features 425 can be disposed directly on one or both of the first or the second surface 422*a* and 422*b* of the light guide 420*a* to disrupt the total internal reflection and extract light out of the circular light guide 420*a*. Although, in some of the figures FIG. 4B-2-4B-6, the light extracting features are disposed on the planar surface 422*a* of the light guide 420*a*, in other implementations, they can be disposed on the inclined surface 422*b*.

In some implementations, the optical coupling system 103, the light redirecting element 305 and the light guide (e.g., circular light guide 405 or light guide 420*a* and 420*b*) can be integrally formed with each other so as to form a unitary body. In some implementations, only the optical coupling system 103 and the light redirecting element 305 can be integrally formed with each so as to form a unitary body. In some other implementations, only the light redirecting element 305 and the light guide (e.g., circular light guide 405 or light guide 420*a* and 420*b*) are integrally formed so as to form a unitary body. The optical coupling system 103, the light redirecting element 305 and the light guide (e.g., circular light guide 405 or light guide 420*a* and 420*b*) can be manufactured using methods such as insert molding, injection molding and/or casting.

In many implementations of light receiving systems utilizing thin light guides, the output apertures of the implementations of optical coupling systems disclosed herein can be configured to input light into the light guides (e.g., circular light guide 405 and/or light guides 420*a* and 420*b*) through their corresponding input aperture (e.g., 407 or 427) such that light output from the optical source is efficiently coupled into the light guides. In various implementations, the output aperture of the optical coupling systems can be smaller than the area over which an optical source including one or more LEDs emits light. Various implementations of optical coupling systems disclosed herein can have output apertures that are smaller than the corresponding input aperture. The reduction in the size of the output aperture of the optical coupling systems can be accomplished without violating fundamental laws. The implementations disclosed herein can also achieve a reduction in the size of the output aperture as compared to the input aperture while preserving etendue. Additionally, the implementations disclosed herein can achieve a reduction in the size of the output aperture as compared to the input aperture without sacrificing brightness.

In various implementations, the input aperture of the light guides incorporated with the light receiving system 107 (e.g., input aperture 407 for the circular light guide 405 and/or input aperture 427 for the light guides 420*a* and 420*b*), can be larger than the output aperture of the optical source 101, and/or larger than the output aperture 109*out* of the optical coupling system 103. However, in other implementations, the input aperture of the light guides incorporated with the light receiving system 107 (e.g., input aperture 407 for the circular light guide 405 and/or input aperture 427 for the light guides 420a and 420b), can be smaller or comparable to the output aperture of the optical source 101, and/or the output aperture 109*out* of the optical coupling system 103.

It is further noted that the efficiency of coupling light into the light guides (e.g., linear and/or circular light guides) that are incorporated with the light receiving system 107 can be increased when the output aperture of the optical coupling system 103 that injects light into the radial or bi-directional couplers 305 is as small as possible. The size of the output aperture of the optical coupling system 103 is influenced by the dimensions/geometry of the bi-directional and/or radial coupler rather than the dimensions of the input aperture of the light guides that are coupled to the bi-directional and/or radial coupler.

For example, in various certain implementations of the optical coupling systems 103 disclosed herein that are coupled to light receiving systems 107 that include a light redirecting element 305 as described above that are optically coupled to the output surface (and correspondingly the output aperture) of the optical coupling system 103, optical coupling efficiency can be increased when the size of the output aperture of the optical coupling system is made as small as possible (whether in width when the light redirecting element 305 is a bi-directional light redirecting element or in diameter when the light redirecting element 305 is a circular light redirecting element) without reducing the output efficiency of the optical coupling system 103. The minimum width or minimum diameter for the output aperture of the optical coupling system 103 is determined as described earlier, by the width or diameter of the input aperture of the optical coupling system 103 and the effective refractive index, n, of the optical coupling system 103. Without the gap 102 between the output aperture of the optical source 101 and the input aperture of the optical coupling system 103, and the angle compression that occurs due to Snell's law, the input aperture and the output aperture of the optical coupling system 103. As a consequence of the gap 102 between the output aperture of the optical source 101 and the input aperture of the optical coupling system 103, and the angle compression that occurs due to Snell's law, the size of the output aperture of the optical coupling system 103 can be smaller by a factor of $n^2$ than the size of the input aperture of the optical coupling system 103. As discussed above, the reduction in the size of the output aperture of the optical coupling system 103 can be achieved without an associated drop in transmission efficiency into the light redirecting element 305.

The compression of the output aperture as introduced earlier, is explained more completely with reference to FIG. 1A. As discussed above, the optical source 101 is spaced apart from the optical coupling system 103 by a thin gap 102 (e.g., an air gap). In implementations of the optical source 101 including one or more LEDs, the emission pattern in air is substantially Lambertian over an area equal to the physical area of the optical source 101. Accordingly, light rays from the optical source 101 are incident on the input surface 105a of the optical coupling system 103 at incident angles between, e.g., −90 degrees and 90 degrees with respect to a normal to the input surface 105a. In the implementation illustrated in FIG. 1A, the input surface 105a has an area that is equal to or greater than the physical area of the optical source 101 such that substantially all light from the Lambertian output pattern of the optical source 101 is received at and across the input surface 105a. As such, the light that is received within the dielectric medium of optical coupling system 103 within its input aperture 105a is converted by Snell's Law from +/−90-degrees in angular extent to a narrower angular extent given by $+/-\mathrm{Sin}^{-1}(1/n_1)$, where $n_1$ is the refractive index of the dielectric material (e.g., glass or polymer) from which optical coupling system 103 has been fabricated. In such implementations, the input aperture associated with the input surface 105a of the optical coupling system is equal to the area of the input surface 105a. For example, if the input surface 105a is a square having a diagonal with length $\sqrt{2}D$, then the input aperture has an area $D^2$. As another example, if the input surface 105a is a rectangle having sides with length $D_x, D_y$, then the input aperture has an area $D_x \times D_y$. As another example, if the input surface 105a is a circle with diameter D, then the input aperture has an area $\pi D^2/4$.

If the material of the optical coupling system 103 has a refractive index n, then light incident on the input surface is refracted through the input aperture into the optical coupling system 103. The angle $\theta_{in}$ that the light rays make with the normal to the input surface 105a inside the optical coupling system 103 is governed by Snell's law given by equation (1) below:

$$n_{gap} \cdot \sin(\theta_{gap}) = n \cdot \sin(\theta_{in}) \quad (1)$$

where, $n_{gap}$ is the refractive index of the material in the gap 102 (e.g., air) and $\theta_{gap}$ is the angle at which light is incident from the optical source 101 on the input surface 105a of the optical coupling system 103. If the gap 102 is an air gap, then $n_{gap}$ is equal to 1. For implementations in which light from the optical source 101 is incident on the input surface 105a of the optical coupling system 103 in an angular range between ±90 degrees and the gap 102 includes air, the angle $\theta_{in}$, that the light rays make with the normal to the input surface 105a inside the optical coupling system 103 is between $\pm\sin^{-1}(1/n)$. If the refractive index of the material of the optical coupling system 103 is 1.52, then the angle $\theta_{in}$ that the light rays make with the normal to the input surface 105a inside the optical coupling system 103 is between ±40.98 degrees.

The light rays that enter the optical coupling system 103 propagate through the optical coupling system 103 toward the output surface 105b and are emitted through an output aperture that is located on this output surface 105b. As discussed above, the sidewalls of the optical coupling system 103 are mathematically shaped to preserve etendue between the system's input aperture 109*in* and output aperture 109*out* as the light propagates through the optical coupling system 103. At the output surface, the light input into the optical coupling system 103 is converted back to a Lambertian distribution by the etendue-preserving shape of the sidewalls such that the light is emitted at angles between ±90 degrees with respect to the normal to the output surface 105b as it flows through the output aperture of optical coupling system 103 that overlaps the input aperture of light receiving system 107. Accordingly, the area of the output aperture satisfies equation (2) below:

$$\mathrm{area}_{input\_aperture} \cdot \sin^2(\theta_{in}) = \mathrm{area}_{output\_aperture} \cdot \sin^2(90°) \quad (2)$$

It is noted from equation (2) that the output aperture of optical coupling system 103 has a smaller area than the input aperture of optical coupling system 103. Furthermore, since the optical coupling system is configured to preserve etendue, compression of the output aperture area is obtained without sacrificing brightness (and associated loss in transmission efficiency).

In implementations where the input surface is a square with sides of length D and the angle inside the angle $\theta_{in}$ that the light rays make with the normal to the input surface 105a inside the optical coupling system 103 is between $\pm\sin^{-1}(1/n)$, the output surface can be configured as a square with sides of length d which is equal to $D \cdot \sin(\sin^{-1}(1/n))$.

If the output medium into which light is emitted from the optical coupling system 103 through the output aperture has a refractive index less than the refractive index (n) of the material of the optical coupling system 103, a significant amount of light can remain trapped in the optical coupling system 103 by total internal reflections that occur at the interface between the two different refractive indices. If the medium into which light from the coupling system's output aperture is being received has a refractive index greater than the refractive index (n) of the material of the optical coupling system 103, Fresnel reflections or total internal reflection can reduce the amount of light that is extracted. Thus, to efficiently extract most of the light that is coupled into the optical coupling system 103 the receiving optical system medium can have a refractive index $n_2$ that is substantially equal to the refractive index $n_1$ of the material of the optical coupling system 103. For example, a difference in the refractive index $n_1$ and $n_2$ can be less than or equal to about 0.01.

Figure 5A:
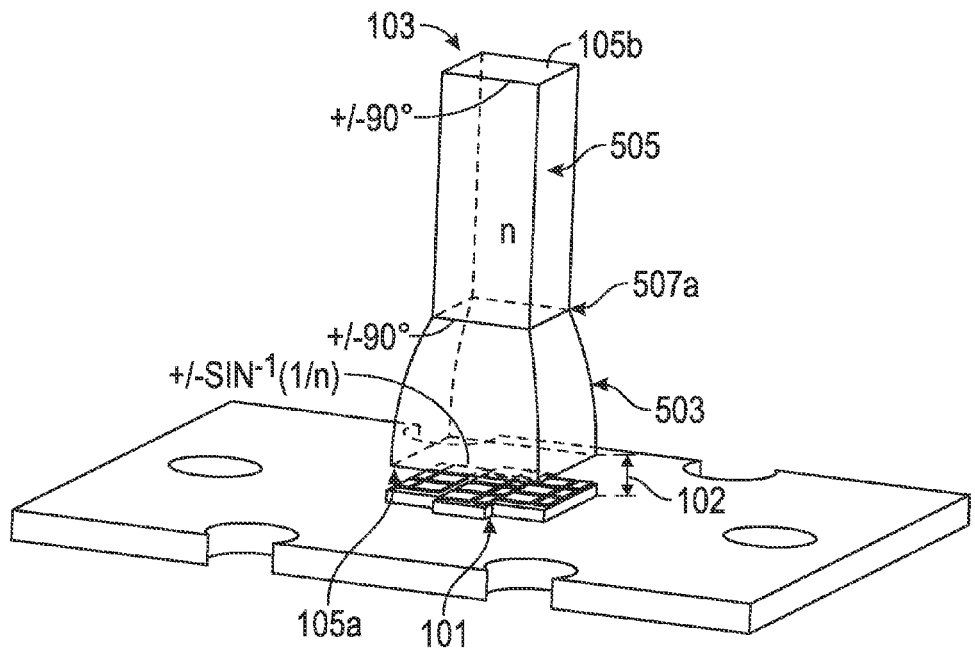
FIGS. 5A and 5B and 5C illustrate implementations of a two stage optical coupling system.
Figure 5B:
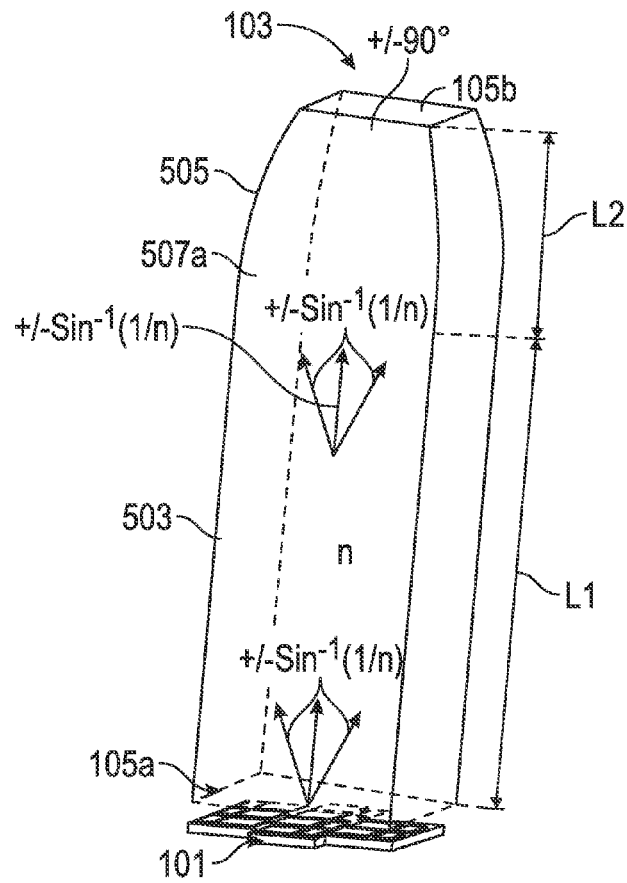
Figure 5C:
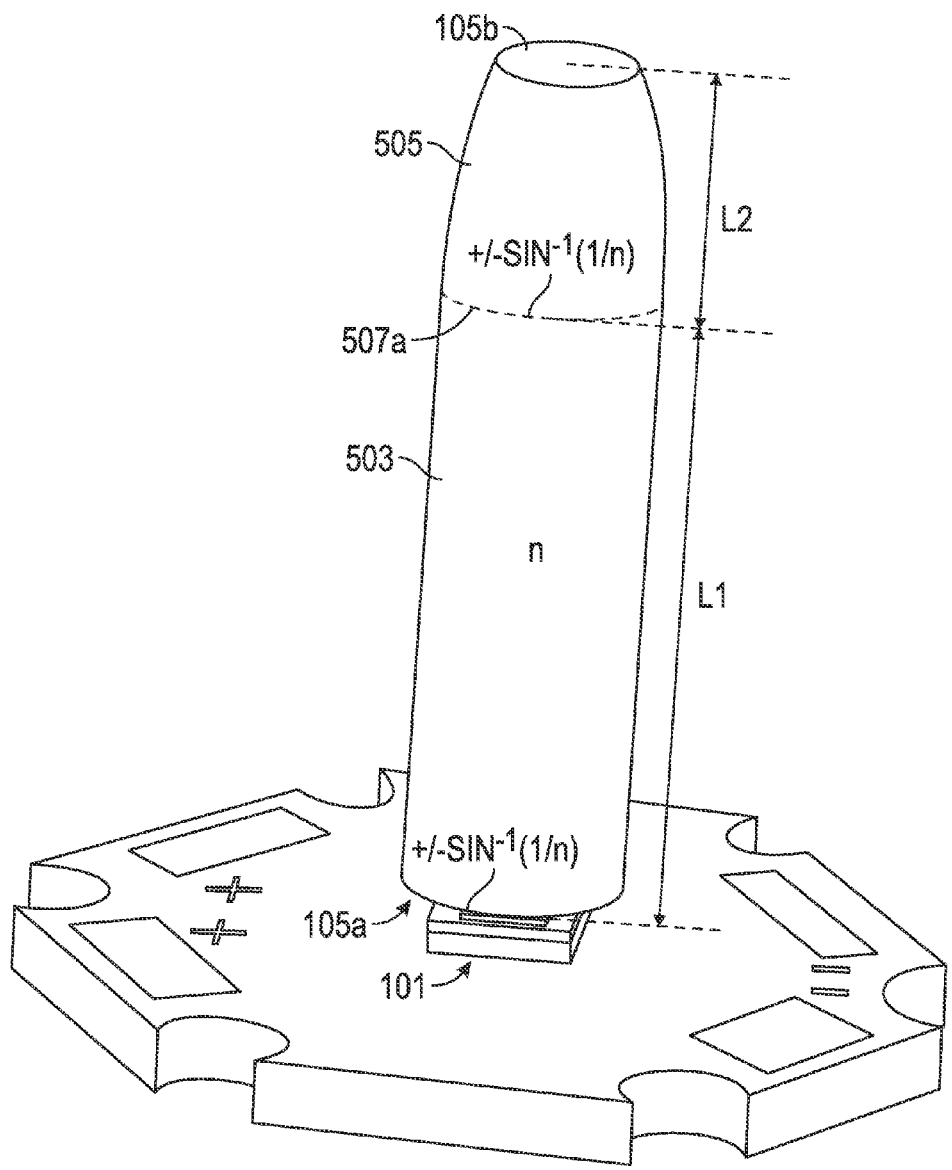
Figure 6:
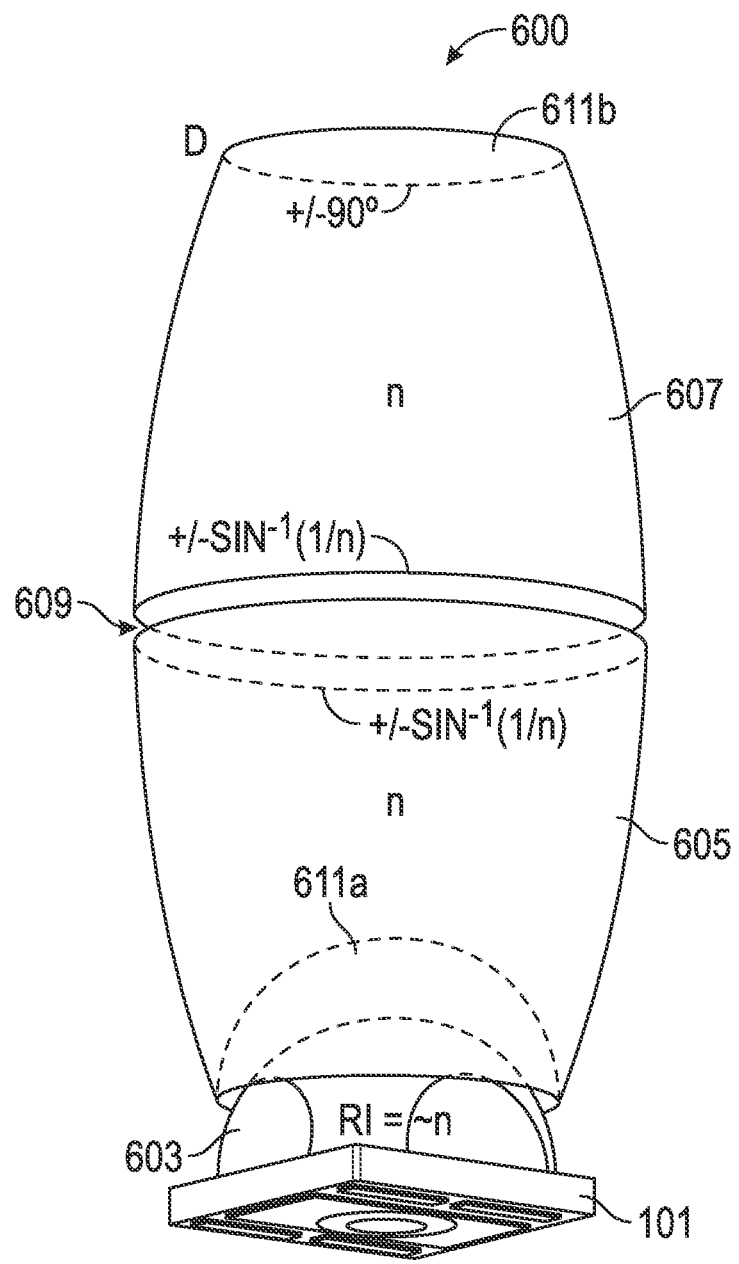

In various implementations, the optical coupling system can employ two stages to effectively compress the output aperture and provide simultaneous mixing of input light wavelengths and angular directions. FIGS. 5A, 5B and 5C illustrate implementations of a two-stage optical coupling system 103 including a first stage 503 and a second stage 505. Although, the implementations illustrated in FIGS. 5A and 5B and 5C show examples of optical coupling systems with square cross-sections (e.g., FIGS. 5A and 5B) and with circular cross-sections (e.g., FIG. 5C), the concepts disclosed herein are applicable generally to implementations of optical coupling systems with rectangular cross-sections as well. In such implementations, both the first and the second stages 503 and 505 of the optical coupling system 103 can be configured to preserve etendue. Referring to FIG. 5A, the first stage 503 of the optical coupling system 103 has an input surface 105a and an output surface 507a. The area of the input surface 105a of the first stage 503 is substantially equal to or larger than the physical area of the optical source 101. The area of the output surface 507a (and consequently the area of the output aperture associated with the output surface 507a) is given by equation 2 above. When the first stage 503 is spaced apart from a Lambertian emitter by an air gap 102, the area of the output aperture is equal to $$\frac{area_{input\_aperture}}{n^2},$$

where n is the refractive index of the material of the first stage 503. Accordingly, the input aperture is compressed by a factor $n^2$.

The implementations of optical coupling systems 103 disclosed herein can also be configured to homogenize (spatially and angularly) the light output from a LED array including LEDs that emit light of different wavelengths (e.g., white, red, blue, lime green, and amber) and input the combined multi-colored light to the light guide. This is explained in detail below with reference to FIGS. 5A, 5B and 6.

In the implementation illustrated in FIG. 5A, the input surface of the second stage 505 has an area substantially equal to the area of the output surface 507a of the first stage 503. In the implementation illustrated in FIG. 5A, the output surface 105b of the second stage 505 is configured to have the same area as the output surface 507a.

Accordingly, the second stage does not compress the output aperture any further. Compression of the output aperture is achieved only by the first stage 503, and occurs as a consequence of the conversion of the narrower input angle $+/-\sin^{-1}(1/n)$ into the wider output angle $+/-90$. The second stage 505, while providing no such angle conversions, can provide spatial mixing of angle and wavelength, which can be useful for certain applications. The amount of spatial mixing provided by the second stage 505 can depend on the length of the second stage, the area of the input and output surfaces of the second stage 505 as well as the total length of the optical coupling system 103.

FIG. 5B illustrates an optical coupling system 103 including a rectangular pipe shaped first stage 503. Since the area of the input surface 105a and the output surface 507a are substantially equal, and no further angle transformation is implemented within the first stage, consequently the first stage 503 does not provide any output aperture compression. However, it can provide spatial mixing of wavelength and angle as discussed above. Output aperture compression, however, is provided by the second stage 505. As discussed above, the area of the output aperture associated with the output surface 105b of the second stage 505 is compressed by a factor $n^2$ if the input surface 105a of the first stage 503 is spaced apart from an optical source by an air gap. In various implementations, the length of the rectangular pipe shaped optical element (e.g., first stage 503 of FIG. 5B or second stage 505 of FIG. 5A) can be less than 25 mm. The length (L2) of the optical compressing stage of the two-stage optical coupling system 103 (e.g., first stage 503 of FIG. 5A or second stage 505 of FIG. 5B) can be obtained from equation (3) below, with $D_{IN}$ being the width of the input aperture, $D_{OUT}$ being the width of the output aperture and $\theta_{IN}$ being the half-angle in either the XZ or YZ meridian of the solid angle of the light as it just enters the input aperture:

$$L2=0.5(D_{OUT}+D_{IN})/\tan^2(\theta_{IN}) \quad (3)$$

FIG. 5C illustrates an optical coupling system 103 including a circular pipe shaped first stage 503. Since the area of the input surface 105a and the output surface 507a are substantially equal, and no further angle transformation is implemented within the first stage, consequently the first stage 503 does not provide any output aperture compression. However, it can provide spatial mixing of wavelength and angle as discussed above. Output aperture compression, however, is provided by the second stage 505. As discussed above, the area of the output aperture associated with the output surface 105b of the second stage 505 is compressed by a factor $n^2$ if the input surface 105a of the first stage 503 is spaced apart from an optical source by an air gap. In various implementations, the length of the circular pipe shaped optical element (e.g., first stage 503 of FIG. 5B or second stage 505 of FIG. 5A) can be less than 25 mm. The length (L2) of the optical compressing stage of the two-stage optical coupling system 103 (e.g., first stage 503 of FIG. 5A or second stage 505 of FIG. 5B) can be obtained from equation (4) below, with $D_{IN}$ being the diameter of the input aperture, $D_{OUT}$ being the diameter of the output aperture and $\theta_{IN}$ being the half-angle of the solid angle of the light as it just enters the input aperture:

$$L2=0.5(D_{OUT}+D_{IN})/\tan^2(\theta_{IN}) \quad (4)$$

As discussed herein, rod like extensions can be added before or after the aperture compression stage in various implementations of optical coupling systems 103 to provide spatial mixing. In some implementations, the rod like extensions can also be configured to extract light from the optical coupling systems 103. The rod like extensions can have a cross-sectional shape, which may be square (as illustrated in FIGS. 5A and 5B), rectangular, or circular (as illustrated in FIG. 5C). The length of the rod like extensions can be selected to provide a desired amount of spatial mixing (or light extraction). It is noted a given length of rod like extensions with a rectangular cross-section can provide more spatial mixing when they have a smaller area (e.g., when the sidewall width is made as small as possible and comparable to the area of the light source). Therefore, it may be advantageous in various implementations to add the rod like extensions after the aperture compression stage.

There are certain instances when a rod like extension of the same refractive index may added to the output aperture of the aperture compression stage for the purpose of extracting a greater amount of light into the surrounding medium than would ordinarily be possible otherwise (without an extension). Without an extension, only about 40%-45% of the +/−90-degree light reaching the compressed aperture's surface 105b, refracts by Snell's Law into the surrounding air in an angular range extending between +/−90-degrees. The remaining light is reflected and trapped inside the first stage 503 and/or the second stage 505 by multiple total internal reflections. In various implementations, it may not be possible to use the light trapped in the first and/or second stages 503 and 505. Some of the light trapped in the first and/or second stages 503 and 505 can be extracted by providing rod-like extensions. The amount of trapped light that is extracted can depend on the thickness of the rod-like extension. For example, rod-like extension having a thickness greater than about 2 mm, can extracts trapped light into air from the top of the extension and from failure of total internal reflection at its cylindrical sidewall with about 85% efficiency as compared to about 60% efficiency when the thickness is about 0.5 mm and about 40%-45% efficiency when the thickness is about 0 mm.

As discussed above, in various implementations, the optical source 101 including one or more LEDs can include a dome shaped hemispherical lens. The size (e.g., radial surface area or radial extent) of the hemispherical lens can interfere physically with otherwise efficient coupling of light between LED array and the light guide's input aperture as its effective coupling surface is hemispherical as opposed to planar. The implementations of optical coupling systems 103 described herein can also be configured to efficiently couple light from an optical source including one or more LEDs covered by hemispherical lens into a thin light guide having a small rectangular or annular input aperture. FIG. 6 illustrates a symmetrical two-stage optical coupling system 600 that is configured to couple light from an optical source 101 including one or more optical sources, such as LEDs, that are positioned as an array of one or more LED chips or emitting areas inside a dome shaped hemispherical lens 603. The symmetrical two-stage optical coupling system 600 includes a first stage 605 having a curved light receiving surface 611a and a second stage 607 having a planar light output surface 611b. The size (e.g., diameter) and shape (e.g., curvature) of the curved light receiving surface 611a can be configured to conform to the size and shape of the hemispherical lens 603. Accordingly, the non-planar hemispherical input coupling surface 611a is configured to accommodate the physical extent of the hemispherical lens 603. For example, input coupling surface 611a can have a size and a shape such that the hemispherical lens 603 can be recessed within the optical coupling system 103. The first stage 605 and the second stage 607 can include material having substantially the same refractive index. For example, the first stage 605 and the second stage 607 can include materials such as PMMA, glass, acrylic, ZEONEX™, polycarbonate or other optical grade polymeric materials.

Operationally, the symmetrical two-stage optical coupling system 600 collects and converts the substantially Lambertian emission from the hemispherical dome lens of the LED having diameter D into a plane circular output aperture having diameter D associated with the output surface 611b through which light is emitted at angles in the range between ±90 degrees with respect to a normal to the output surface 611b. The output from the optical source 101 that is predominantly Lambertian is incident on the curved surface 611a at angles between ±90 degrees with respect to a normal to the output surface 611b is coupled into the first stage 605 such that the light rays inside the first stage 605 make an angle between $\pm\sin^{-1}(1/n)$ with respect to the normal to the output surface 611b. At the interface 609 between the first stage 605 and the second stage 609, majority of the light in the first stage is within an angular range between $\pm\sin^{-1}(1/n)$ with respect to the normal to the output surface 611b. The diameter D' of the interface 609 between the first stage 605 and the second stage 609 is given by the equation (4) below:

$$D \cdot \sin(90) = D' \cdot \sin(\sin^{-1}(1/n)) \tag{4}$$

where n is the refractive index of two-stage optical coupling system 600.

It is noted from equation (4) that the output aperture at the interface 609 which is equal to the diameter D' of the interface 609 is larger than the input aperture D.

The second stage 607 is configured to be identical to the first stage 605. Accordingly, by principal of reciprocity, the light at the output surface is within an angular range between ±90 degrees with respect to the normal to the output surface 611b and output through an output aperture having a diameter D.

In various implementations, the interface 609 may include a thin air gap. In some implementations, the first and the second stages may be adhered to each other at the interface 609 with adhesives. In some other implementations, the symmetric two-stage optical coupling system 600 can be integrally formed such that the interface 609 between its first and the second stages is not physically present. The symmetric two-stage optical coupling system 600 can be configured to be coupled to the radially symmetric light redirecting element 305 illustrated in FIG. 3C. In various implementations, a third optical coupling stage similar to the optical coupling system 103 can be integrated with symmetric two-stage optical coupling system 600 to further compress the output aperture. In various implementations, a diffusive layer (e.g., a Mie scattering layer) can be disposed within the hemispherical lens 603 or at the curved surface 611a to provide color mixing function in implementations of the optical source 101 including multiwavelength LEDs.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the proper orientation of the structures described herein, as those structures are implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An optical system comprising:
an optical coupling system including:
a light input surface configured to receive incident light through an input aperture; and
a light output surface configured to emit the incident light through an output aperture having an area smaller than an area of the input aperture,
wherein the optical coupling system is configured to couple to an optical source separated from the light input surface by a gap, the gap including a medium having lower refractive index than the refractive index of material forming the optical coupling system; and
an optical receiving system optically coupled to the light output surface of the optical coupling system, the optical receiving system including:
a light redirecting element configured to receive light from the light output surface of the optical coupling system along an incident direction and redirect the light along an output direction that is at an angle with respect to the incident direction; and
a light guide configured to internally propagate the redirected light,
wherein a material of the optical receiving system optically coupling with the output aperture has substantially the same refractive index as material of the optical coupling system, and
wherein the optical coupling system is configured to preserve etendue of the light emitted from the output surface relative to the etendue of light incident on the input surface of the optical coupling system.

2. The optical system of claim 1, wherein a ratio of the area of the input aperture to the area of the output aperture is approximately $n^2$, where n is the refractive index of the material forming the optical coupling system.

3. The optical system of claim 1, wherein the light input surface is square, rectangular, circular or polygonal.

4. The optical system of claim 1, wherein the gap is filled with air.

5. The optical system of claim 1, wherein the light redirecting element includes an etendue preserving reflector.

6. The optical system of claim 1, wherein the light redirecting element includes a reflecting surface.

7. The optical system of claim 6, wherein the reflecting surface has a polynomially shaped cross-section.

8. The optical system of claim 6, wherein the reflecting surface is configured to redirect a first portion of light incident thereon and transmit a portion of light incident thereon.

9. The optical system of claim 6, wherein the reflecting surface includes a plurality of optical apertures configured to transmit light.

10. The optical system of claim 1, wherein the light redirecting element includes an input aperture of the light guide.

11. The optical system of claim 1, wherein the light redirecting element includes a cylindrical light output surface configured to couple light into a cylindrical input surface of the light guide.

12. The optical system of claim 1, wherein the light redirecting element includes a rectangular light output surface configured to couple light into a rectangular input surface of the light guide.

13. The optical system of claim 1, wherein the angle between the output direction and the incident direction is less than or equal to 160 degrees.

14. The optical system of claim 1, wherein the light guide has a light output surface, wherein a cross-section of the light guide in a plane perpendicular to the light output surface is tapered such that a surface opposite the light output surface is inclined and disposed at an angle $\alpha_1$ with respect to the light guide output surface, the angle $\alpha_1$ being less than 15 degrees.

15. The optical system of claim 14, wherein the light guide has a shape of a tapered disc, wherein the light redirecting element is disposed in the interior of the tapered disc.

16. The optical system of claim 15, wherein the output aperture of the optical coupling system is in the interior of the tapered disc.

17. The optical system of claim 16, wherein the light redirecting element is a curved reflector that is configured to emit redirected light along substantially radial directions within the tapered disc.

18. An optical system comprising:
a means for coupling light, the light coupling means including:

a light input surface configured to receive incident light through an input aperture; and a light output surface configured to emit the incident light through an output aperture having an area smaller than an area of the input aperture, wherein the light coupling means is configured to couple to a means for emitting light, the light emitting means being separated from the light input surface by a gap, the gap including a medium having lower refractive index than the refractive index of material forming the light coupling means; and a means for receiving light, the light receiving means being optically coupled to the light output surface of the light coupling means, the light receiving means including:

a means for redirecting light, the light redirecting means being configured to receive light from the light output surface of the light coupling means along an incident direction and redirect the light along an output direction that is at an angle with respect to the incident direction; and a means for guiding light configured to internally propagate the redirected light, wherein a material of the light receiving means that is optically coupled with the output aperture has substantially the same refractive index as material of the light coupling means, and wherein the light coupling means is configured to preserve etendue of the light emitted from the output surface relative to the etendue of light incident on the input surface of the light coupling means.

19. The optical system of claim 18, wherein the light coupling means includes an optical coupling system, the light receiving means includes a light receiving system and the light guiding means includes a light guide.

20. The optical system of claim 18, wherein a ratio of the area of the input aperture to the area of the output aperture is approximately $n^2$, where n is the refractive index of the material forming the light coupling means.

21. A method of manufacturing an optical system, the method comprising:

providing an optical coupling system including:

a light input surface configured to receive incident light through an input aperture; and a light output surface configured to emit the incident light through an output aperture having an area smaller than an area of the input aperture, wherein the optical coupling system is configured to couple to an optical source separated from the light input surface by a gap, the gap including a medium having lower refractive index than the refractive index of material forming the optical coupling system; and providing an optical receiving system optically coupled to the light output surface of the optical coupling system, the optical receiving system including:

a light redirecting element configured to receive light from the light output surface of the optical coupling system along an incident direction and redirect the light along an output direction that is at an angle with respect to the incident direction; and a light guide configured to internally propagate the redirected light, wherein a material of the optical receiving system optically coupling with the output aperture has substantially the same refractive index as material of the optical coupling system, and wherein the optical coupling system is configured to preserve etendue of the light emitted from the output surface relative to the etendue of light incident on the input surface of the optical coupling system.

22. The method of claim 21, wherein a ratio of the area of the input aperture to the area of the output aperture is approximately $n^2$, where n is the refractive index of the material forming the optical coupling system.

* * * * *